(12) United States Patent
Yamagishi et al.

(10) Patent No.: US 6,968,118 B1
(45) Date of Patent: Nov. 22, 2005

(54) IMAGE PROCESSING APPARATUS, ITS CONTROL METHOD, AND STORAGE MEDIUM

(75) Inventors: Yoichi Yamagishi, Tokyo (JP); Taku Yamagami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/263,005

(22) Filed: Mar. 5, 1999

(30) Foreign Application Priority Data

Mar. 11, 1998 (JP) ................................. 10-059612
Mar. 11, 1998 (JP) ................................. 10-059613

(51) Int. Cl.[7] .............................................. H04N 5/91
(52) U.S. Cl. ...................................... 386/107; 386/117
(58) Field of Search .......................... 386/46, 107, 117; 358/906, 909.1; 348/372, 333.02, 222.1, 348/333.09, 333.05; 396/429

(56) References Cited

U.S. PATENT DOCUMENTS

| 4,571,627 | A | * | 2/1986 | Stempeck | 348/333.09 |
| 4,740,828 | A | * | 4/1988 | Kinoshita | 348/222.1 |
| 4,812,922 | A | * | 3/1989 | Minoura et al. | 386/82 |
| 5,111,299 | A | * | 5/1992 | Aoki et al. | 348/333.02 |
| 5,161,025 | A | * | 11/1992 | Nakao | 348/333.05 |
| 5,367,332 | A | * | 11/1994 | Kerns et al. | 348/61 |
| 5,845,166 | A | * | 12/1998 | Fellegara et al. | 396/429 |
| 5,970,202 | A | * | 10/1999 | Takei et al. | 386/46 |
| 6,486,916 | B1 | * | 11/2002 | Stevens | 348/372 |

* cited by examiner

Primary Examiner—Huy Nguyen
(74) Attorney, Agent, or Firm—Morgan & Finnegan, L.L.P.

(57) ABSTRACT

This invention has as its object to provide a control method of an image processing apparatus which allows confirmation of the sensed image without considerably reducing the operable time of a camera and the number of images that can be sensed. To achieve this object, even when an image display mode is disabled, if a quick review mode is enabled, an image is recorded on a memory immediately after image sensing, a display unit is enabled, and the image stored in the memory is played back and displayed.

22 Claims, 12 Drawing Sheets

FLOW CHART SHOWING DISTANCE MEASUREMENT/PHOTOMETRY IN DETAIL

FLOW CHART SHOWING IMAGE SENSING PROCESS IN DETAIL

FLOW CHART SHOWING RECORDING PROCESS IN DETAIL

FLOW CHART SHOWING MAIN ROUTINE

FLOW CHART SHOWING MAIN ROUTINE

FLOW CHART SHOWING DISPLAY IMAGE PROCESS IN DETAIL

FLOW CHART SHOWING COMPRESSION PROCESS IN DETAIL

IMAGE PROCESSING APPARATUS, ITS CONTROL METHOD, AND STORAGE MEDIUM

BACKGROUND OF THE INVENTION

The present invention relates to an image processing apparatus for sensing, recording, and playing back still and moving images, its control method, and a storage medium.

Conventionally, image processing apparatuses such as electronic cameras and the like, which record/play back still and moving images using memory cards having solid state memory elements as recording media have already been commercially available, and electronic cameras with electronic viewfinders such as color liquid crystal panels and the like have also been commercially available.

These electronic cameras allow the electronic camera user to determine the camera angle by continuously displaying images before sensing, and to confirm the sensed images by playing back and displaying them.

Especially, the function of playing back a sensed image immediately after image sensing is very convenient and effective for the electronic camera user.

In such conventional image processing apparatus such as an electronic camera or the like, when an image is displayed on an electronic viewfinder such as a color liquid crystal panel or the like, since the color liquid crystal panel consumes much electric power, the operable time and the number of images that can be sensed decrease considerably.

On the other hand, when image sensing is done using an optical viewfinder while turning off the electronic viewfinder such as a color liquid crystal panel or the like, consumption power can be reduced, and the operable time and the number of images that can be sensed can be greatly increased. However, in such case, the sensed image cannot be played back and displayed immediately after image sensing, resulting in inconvenience.

Also, in the conventional image processing apparatus such as an electronic camera or the like, in order to easily play back and display a sensed image immediately after image sensing, sensed image data is converted into an image signal format suitable for image playback at an image display unit, and the converted signal is written in a recording medium.

For this reason, a combination of a luminance signal Y and color difference signals R-Y and B-Y, a combination of R, G, and B signals, and the like are used in correspondence with the signal inputs of the image display unit, regardless of the pixel format of an image sensing means such as a CCD or the like. Even in an electronic camera that uses an image sensing means with a unique pixel format, which can assure high image quality, when such camera has a function of playing back and displaying a sensed image immediately after image sensing, an image signal is not recorded in a format that can make most of the high image quality.

On the other hand, in case of an electronic camera which writes sensed image data in a recording medium in an image signal format corresponding to the pixel format of an image sensing means such as a CCD or the like, the recorded image quality can assure high performance of the image sensing means. However, since this image signal format is not suitable for image playback at the image display unit, a sensed image cannot be directly played back and displayed.

SUMMARY OF THE INVENTION

The present invention has been made in consideration of such situation, and has as its object to provide an image processing apparatus which allows confirmation of the sensed image without considerably reducing the operable time and the number of images that can be sensed of a camera, its control method, and a recording medium.

It is another object of the present invention to provide an image processing apparatus which can select whether a sensed image is directly played back and displayed immediately after image sensing and is then recorded, or the sensed image is recorded while assuring high quality of that image, and is then played back and displayed, its control method, and a recording medium.

In order to solve the aforementioned problems and to achieve the above objects, an image processing apparatus of the present invention is characterized by the following arrangement according to its first aspect.

That is, there is provided an image processing apparatus for recording, and playing back and displaying a sensed still image and/or moving image on a recording medium, comprising: image sensing means, memory means, control means, and display means, wherein the control means stores an image signal output from the image sensing means in the memory means while the display means is disabled, enables the display means immediately after the storage, and plays back and displays the image signal stored in the memory means on the display means.

An image processing apparatus of the present invention is characterized by the following arrangement according to its second aspect.

That is, there is provided an image processing apparatus for recording, and playing back and displaying a sensed still image and/or moving image on a recording medium, comprising: image sensing means, memory means, control means, and display means, wherein the control means stores an image signal output from the image sensing means in the memory means while the display means is disabled, enables the display means immediately after the storage, plays back and displays the image signal stored in the memory means on the display means for a predetermined period of time, and then disables the display means.

An image processing apparatus of the present invention is characterized by the following arrangement according to its third aspect.

That is, there is provided an image processing apparatus for recording, and playing back and displaying a sensed still image and/or moving image on a recording medium, comprising: image sensing means, memory means, control means, display means, display mode setting means, and sense-and-play mode setting means, wherein when the display mode setting means is set to disable the display means, and the sense-and-play mode setting means is set to play back an image immediately after image sensing, the control means stores an image signal output from the image sensing means in the memory means while the display means is disabled, enables the display means immediately after the storage, and plays back and displays the image signal stored in the memory means on the display means.

An image processing apparatus of the present invention is characterized by the following arrangement according to its fourth aspect.

That is, there is provided an image processing apparatus for recording, and playing back and displaying a sensed still image and/or moving image on a recording medium, comprising: image sensing means, memory means, control means, display means, display mode setting means, sense-and-play mode setting means, and image sensing instruction means, wherein when the display mode setting means is set to disable the display means, and the sense-and-play mode setting means is set to play back an image immediately after image sensing, if the image sensing instruction means instructs start of image sensing, the control means stores an image signal output from the image sensing means in the memory means while the display means is disabled, and enables the display means immediately after the storage, and if the image sensing instruction means instructs end of image sensing, the control means disables the display means.

An image processing apparatus of the present invention is characterized by the following arrangement according to its fifth aspect.

That is, there is provided an image processing apparatus for recording, and playing back and displaying a sensed still image and/or moving image on a recording medium, comprising: image sensing means, memory means, recording means, control means, display means, display mode setting means, and sense-and-play mode setting means, wherein when the display mode setting means is set to disable the display means, and the sense-and-play mode setting means is set to play back an image immediately after image sensing, the control means stores an image signal output from the image sensing means in the memory means while the display means is disabled, enables the display means immediately after the storage, plays back and displays the image signal stored in the memory means, and transfers the image signal stored in the memory means to record the image signal on the recording means.

An image processing apparatus of the present invention is characterized by the following arrangement according to its sixth aspect.

That is, there is provided an image processing apparatus for recording, and playing back and displaying a sensed still image and/or moving image on a recording medium, comprising: image sensing means, memory means, recording means, control means, display means, display mode setting means, sense-and-play mode setting means, and image sensing instruction means, wherein when the display mode setting means is set to disable the display means, and the sense-and-play mode setting means is set to play back an image immediately after image sensing, if the image sensing instruction means instructs start of image sensing, the control means stores an image signal output from the image sensing means in the memory means while the display means is disabled, enables the display means immediately after the storage, plays back and displays the image signal stored in the memory means, and transfers the image signal stored in the memory means to record the image signal on the recording means, and if the image sensing instruction means instructs end of image sensing, the control means disables the display means.

A control method of an image processing apparatus of the present invention is characterized by the following arrangement according to its first aspect.

That is, there is provided a control method of an image processing apparatus for recording, and playing back and displaying a sensed still image and/or moving image on a recording medium, comprising the steps of: storing an image signal output from image sensing means in a memory while display means is disabled; enabling the display means immediately after the storage; and playing back and displaying the image signal stored in the memory means on the display means.

A control method of an image processing apparatus of the present invention is characterized by the following arrangement according to its second aspect.

That is, there is provided a control method of an image processing apparatus for recording, and playing back and displaying a sensed still image and/or moving image on a recording medium, comprising the steps of: storing an image signal output from image sensing means in a memory while display means is disabled; enabling the display means immediately after the storage; playing back and displaying the image signal stored in the memory means on the display means for a predetermined period of time; and then disabling the display means.

A control method of an image processing apparatus of the present invention is characterized by the following arrangement according to its third aspect.

That is, there is provided a control method of an image processing apparatus for recording, and playing back and displaying a sensed still image and/or moving image on a recording medium, comprising the steps of: when display mode setting means is set to disable display means and sense-and-play mode setting means is set to play back an image immediately after image sensing, storing an image signal output from image sensing means in a memory while the display means is disabled; enabling the display means immediately after the storage; and playing back and displaying the image signal stored in the memory means on the display means.

A control method of an image processing apparatus of the present invention is characterized by the following arrangement according to its fourth aspect.

That is, there is provided a control method of an image processing apparatus for recording, and playing back and displaying a sensed still image and/or moving image on a recording medium, comprising the steps of: when display mode setting means is set to disable display means and sense-and-play mode setting means is set to play back an image immediately after image sensing, if image sensing instruction means instructs start of image sensing, storing an image signal output from image sensing means in a memory while the display means is disabled; enabling the display means immediately after the storage; and playing back and displaying the image signal stored in the memory means on the display means, and if the image sensing instruction means instructs end of image sensing, disabling the display means.

A control method of an image processing apparatus of the present invention is characterized by the following arrangement according to its fifth aspect.

That is, there is provided a control method of an image processing apparatus for recording, and playing back and displaying a sensed still image and/or moving image on a recording medium, comprising the steps of: when display mode setting means is set to disable display means and sense-and-play mode setting means is set to play back an image immediately after image sensing, storing an image signal output from image sensing means in a memory while the display means is disabled; enabling the display means immediately after the storage; playing back and displaying the image signal stored in the memory means on the display means; and transferring the image signal stored in the memory means to record the image signal on recording means.

A control method of an image processing apparatus of the present invention is characterized by the following arrangement according to its sixth aspect.

That is, there is provided a control method of an image processing apparatus for recording, and playing back and displaying a sensed still image and/or moving image on a recording medium, comprising the steps of: when display mode setting means is set to disable display means and sense-and-play mode setting means is set to play back an image immediately after image sensing, if image sensing instruction means instructs start of image sensing, storing an image signal output from image sensing means in a memory while the display means is disabled; enabling the display means immediately after the storage; playing back and displaying the image signal stored in the memory means on the display means; and transferring the image signal stored in the memory means to record the image signal in recording means, and if the image sensing instruction means instructs end of image sensing, disabling the display means.

A storage medium of the present invention is characterized by the following arrangement according to its first aspect.

That is, there is provided a storage medium storing a program for implementing one of the above-mentioned control methods of an image processing apparatus.

An image processing apparatus of the present invention is characterized by the following arrangement according to its seventh aspect.

That is, there is provided an image processing apparatus for recording, and playing back and displaying a sensed still image and/or moving image on a recording medium, comprising: image sensing means, recording means, and display means, and the apparatus having: a first recording mode for displaying an image signal output from the image sensing means on the display means, and then recording the image signal in the recording means in an image signal display format; and a second recording mode for recording an image output from the image sensing means in the recording means in an image signal sense format, and then displaying the image signal on the display means.

An image processing apparatus of the present invention is characterized by the following arrangement according to its eighth aspect.

That is, there is provided an image processing apparatus for recording, and playing back and displaying a sensed still image and/or moving image on a recording medium, comprising: image sensing means, signal processing means, recording means, and display means, the image processing apparatus having: a first signal format corresponding to an input image signal of the display means; and a second signal format corresponding to an output image signal of the image sensing means, and the apparatus further having: a first recording mode for displaying an image signal output from the image sensing means on the display means by converting the image signal into the first signal format by the signal processing means, and then recording the image signal in the recording means; and a second recording mode for recording an image output from the image sensing means in the recording means in the second signal format, and then displaying the image signal on the display means by converting the image signal into the first signal format by the signal processing means.

An image processing apparatus of the present invention is characterized by the following arrangement according to its ninth aspect.

That is, there is provided an image processing apparatus for recording, and playing back and displaying a sensed still image and/or moving image on a recording medium, comprising: image sensing means, signal processing means, compression means, recording means, and display means, the image processing apparatus having: a first signal format corresponding to an input image signal of the display means; and a second signal format corresponding to an output image signal of the image sensing means, and the apparatus further having: a first recording mode for displaying an image signal output from the image sensing means on the display means by converting the image signal into the first signal format by the signal processing means, and then compressing the converted image signal by the compression means and recording the compressed signal in the recording means; and a second recording mode for recording an image signal output from the image sensing means in the second signal format, converting the recorded image signal into the first signal format by the signal processing means, and displaying the converted signal on the display means.

A control method of an image processing apparatus of the present invention is characterized by the following arrangement according to its seventh aspect.

That is, there is provided a control method of an image processing apparatus for recording, and playing back and displaying a sensed still image and/or moving image on a recording medium, comprising: the first recording mode step of displaying an image signal output from image sensing means on display means, and then recording the image signal in recording means in an image signal display format; the second recording mode step of recording an image signal output from the image sensing means in the recording means in an image signal sense format, and then displaying the image signal on the display means; and the step of selecting one of the first and second recording mode steps.

A control method of an image processing apparatus of the present invention is characterized by the following arrangement according to its eighth aspect.

That is, there is provided a control method of an image processing apparatus for recording, and playing back and displaying a sensed still image and/or moving image on a recording medium, comprising: the first recording mode step of displaying an image signal output from image sensing means on display means by converting the image signal into a first signal format corresponding to an input image signal of the display means, and recording the image signal in recording means; the second recording mode step of recording an image signal output from the image sensing means in the recording means in a second signal format corresponding to an output image signal of the image sensing means, and then displaying the image signal on the display means by converting the image signal into the first signal format; and the step of selecting one of the first and second recording mode steps.

A control method of an image processing apparatus of the present invention is characterized by the following arrangement according to its ninth aspect.

That is, there is provided a control method of an image processing apparatus for recording, and playing back and displaying a sensed still image and/or moving image on a recording medium, comprising: the first recording mode step of displaying an image signal output from image sensing means on display means by converting the image signal into a first signal format corresponding to an input image signal of the display means, compressing the converted image signal, and recording the compressed image signal in recording means; the second recording mode step of recording an image signal output from the image sensing means in the recording means in a second signal format corresponding to an output image signal of the image sensing means, converting the recorded image signal into the first signal format, and displaying the converted image signal on the display means; and the step of selecting one of the first and second recording mode steps.

A storage medium of the present invention is characterized by the following arrangement according to its second aspect.

That is, there is provided a storage medium storing a program for implementing one of the above-mentioned control methods of an image processing apparatus.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The preferred embodiments of the present invention will be described in detail hereinafter with reference to the accompanying drawings.

Note that the present invention can be practiced not only in the form of an image processing apparatus but also in the form of a control method of an image processing apparatus, and a storage medium such as a CD-ROM or the like that stores a program for implementing this control method.

First Embodiment

Figure 1:
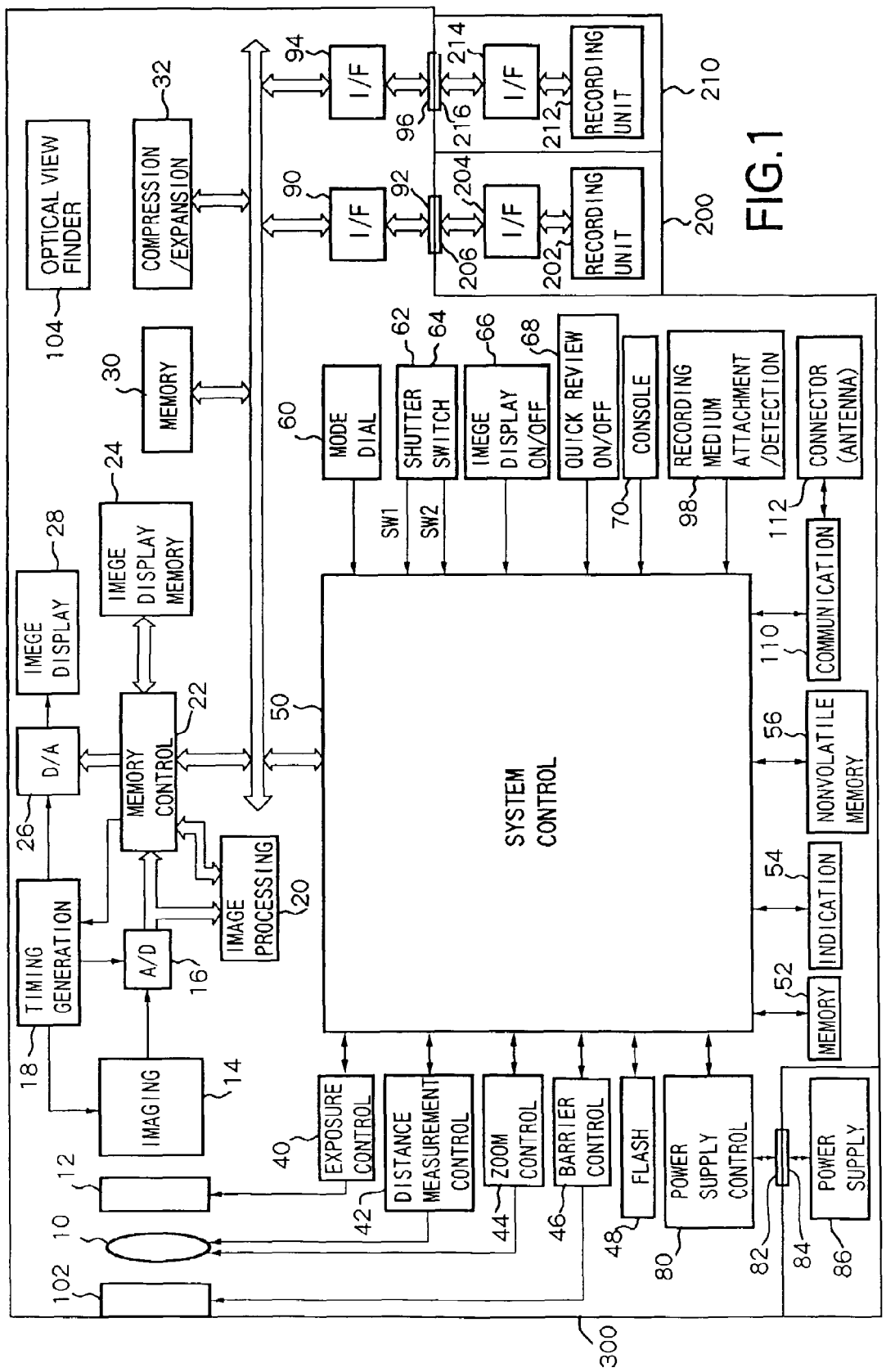
FIG. 1 is a block diagram showing the arrangement according to the first embodiment of the present invention.

FIG. 1 is a block diagram showing the arrangement of an "image processing apparatus" according to the first embodiment. Referring to FIG. 1, reference numeral 100 denotes an image processing apparatus. Reference numeral 10 denotes a photographing lens; 12, a shutter with a stop function; 14, an image sensing element for converting an optical image into an electrical signal; and 16, an A/D converter for converting an analog signal output from the image sensing element 14 into a digital signal.

Reference numeral 18 denotes a timing generation circuit for supplying clock signals and control signals to the image sensing element 14, the A/D converter 16, and a D/A converter 26. The timing generation circuit 18 is controlled by a memory control circuit 22 and system control circuit 50.

Reference numeral 20 denotes an image processing circuit which performs predetermined pixel interpolation and color conversion for data supplied from the A/D converter 16 or the memory control circuit 22. The image processing circuit 20 makes a predetermined computation using sensed image data to execute a TTL (Through The Lens) AF (auto focus) process, AE (auto exposure) process, and EF (flash pre-emission) process in which the system control circuit 50 controls an exposure control means 40 and distance measurement control means 42 on the basis of the obtained computation result. Furthermore, the image processing circuit 20 makes a predetermined computation using sensed image data, and executes a TTL AWB (auto white balance) process on the basis of the obtained computation result.

Reference numeral 22 denotes the memory control circuit, which controls the A/D converter 16, the timing generation circuit 18, the image processing circuit 20, an image display memory 24, the D/A converter 26, a memory 30, and a compression/expansion circuit 32.

Data output from the A/D converter 16 is written in the image display memory 24 or memory 30 via the image processing circuit 20 and memory control circuit 22 or directly via the memory control circuit 22.

Reference numeral 24 denotes the image display memory; 26, the D/A converter; and 28, an image display unit comprising a TFT LCD or the like. Display image data written in the image display memory 24 is displayed by the image display unit 28 via the D/A converter 26. When sensed image data are displayed at image sensing timings using the image display unit 28, an electronic viewfinder function can be implemented. The image display unit 28 can arbitrarily turn on/off its display in response to an instruction from the system control circuit 50. When the display is turned off, the consumption power of the image processing apparatus 100 can be greatly reduced.

Reference numeral 30 denotes the memory for storing a still image and moving image. The memory 30 has a storage capacity large enough to store a predetermined number of still images or a moving image for a predetermined period of time. With this arrangement, even in a continuous or panoramic image sensing mode for continuously sensing a plurality of still images, many images can be written in the memory 30 at high speed. Also, the memory 30 can be used as a work area of the system control circuit 50.

Reference numeral 32 denotes the compression/expansion circuit for compressing/expanding image data by adaptive discrete cosine transformation (ADCT) or the like. The compression/expansion circuit 32 reads an image stored in the memory 30, compresses or expands it, and writes the processed data in the memory 30.

Reference numeral 40 denotes the exposure control means for controlling the shutter 12 with the stop function. The exposure control means 40 also has a flash light control function in cooperation with an electronic flash 48.

Reference numeral 42 denotes the distance measurement control means for controlling focusing of the photographing lens 10; 44, a zoom control means for controlling zooming of the photographing lens; and 46, a barrier control means for controlling operation of a protection means 102 serving as a barrier.

Reference numeral 48 denotes the electronic flash which has a function of projecting AF auxiliary light and the flash light control function.

The exposure control means 40 and distance measurement control means 42 are controlled using TTL, and the system control circuit 50 controls the exposure control means 40 and distance measurement control means 42 on the basis of the computation result of the image processing circuit 20 using sensed image data.

Reference numeral 50 denotes the system control circuit for controlling the overall image processing apparatus 100; and 52, a memory for storing-constants, variables, programs, and the like for operations of the system control circuit 50.

Reference numeral 54 denotes an indication unit which includes a liquid crystal display device, loudspeaker, and the like, and indicates operation states, messages, and the like using characters, images, voices, and the like in accordance with execution of a program by the system control circuit 50. The indication unit 54 is placed at one or a plurality of easy-to-see positions around the console of the image processing apparatus 100, and is comprised of a combination of an LCD, LEDs, tone generation element, and the like. Some functions of the indication unit 54 are placed within an optical viewfinder 104.

Of the indication contents of the indication unit 54, those indicated on an LCD or the like include, e.g., a single shot/continuous shot indication, self-timer indication, compression ratio indication, recording pixel count indication, recording image count indication, remaining photographable image count indication, shutter speed indication, aperture value indication, exposure correction indication, flash indication, red-eye suppression indication, macro-image sensing indication, buzzer setting indication, timepiece battery remaining capacity indication, error indication, information indication using a plurality of digits of numerals, loading/unloading state indication of recording media 200 and 210, communication I/F operation indication, date/time indication, indication that indicates a connection state with an external computer, and the like.

Of the indication contents of the indication unit 54, those indicated within the optical viewfinder 104 include, e.g., an in-focus indication, image sensing ready indication, camera shake alert indication, flash charging indication, flash charging completion indication, shutter speed indication, aperture value indication, exposure correction indication, recording medium write access indication, and the like.

Furthermore, of the indication contents of the indication unit 54, those indicated by LEDs or the like include, e.g., in-focus indication, image sensing ready indication, camera shake alert indication, flash charging indication, flash charging completion indication, recording medium write access indication, macro-image sensing setting notification indication, secondary battery charged state indication, and the like.

Of the indication contents of the indication unit 54, those to be indicated by lamps include, e.g., a self-timer notification lamp, and the like. The self-timer notification lamp may be commonly used as that for emitting AF auxiliary light.

Reference numeral 56 denotes a rewritable nonvolatile memory, which uses, e.g., an EEPROM.

Reference numerals 60, 62, 64, 66, 68, and 70 denote operation means for inputting various operation instructions of the system control circuit 50. These operation means are constructed by one or a plurality of combinations of a switch, a dial, a touch panel, a pointer using line of sight detection, a voice recognition device, and the like.

An example of these operation means will be explained below. Reference numeral 60 denotes a mode dial switch, which can switch various function modes such as power OFF, an automatic image sensing mode, image sensing mode, panoramic image sensing mode, playback mode, multi-frame playback/erase mode, PC connection mode, and the like.

Reference numeral 62 denotes a shutter switch SW1, which is turned on in the middle of operation (at the half stroke position) of a shutter button (not shown), and instructs start of an AF (auto focus) process, AE (auto exposure) process, AWB (auto white balance) process, EF (flash pre-emission) process, and the like.

Reference numeral 64 denotes a shutter switch SW2, which is turned on upon completion of operation (at the full stroke position) of the shutter button (not shown), and instructs start of a series of processes including an exposure process for writing a signal read out from the image sensing element 14 as image data in the memory 30 via the A/D converter 16 and memory control circuit 22, a development process using computation results in the image processing circuit 20 and memory control circuit 22, and a recording process for reading out image data from the memory 30, compressing the readout data by the compression/expansion circuit 32, and writing the compressed image data in the recording medium 200 or 210.

Reference numeral 66 denotes an image display ON/OFF switch, which can set an ON/OFF state of the image display unit 28. With this function, when current supply to the image display unit 28 comprising the TFT LCD or the like is cut off upon image sensing using the optical viewfinder 104, power savings can be attained.

Reference numeral 68 denotes a quick review ON/OFF switch which sets a quick review function that automatically plays back sensed image data immediately after image sensing. Note that this embodiment especially has a function of setting the quick review function when the image display unit 28 is turned off.

Reference numeral 70 denotes a console including various buttons, touch panel, and the like, which include a menu button, set button, macro button, multi-frame playback new page button, flash setting button, single shot/continuous shot/self-timer switch button, menu movement +(plus) button, menu movement −(minus) button, playback image movement +(plus) button, playback image movement −(minus) button, sensed image quality selection button, exposure correction button, date/time setting button, and the like.

Reference numeral 80 denotes a power supply control means, which is comprised of a battery detection circuit, a DC—DC converter, a switch circuit for switching a block to be energized, and the like. The power supply control means 80 detects the presence/absence, type, and remaining battery amount of a battery attached, controls the DC—DC converter on the basis of such detection results and an instruction from the system control circuit 50, and supplies a required voltage to the respective units including the recording medium for a required period of time.

Reference numerals 82 and 84 denote connectors; and 86, a power supply means including a primary battery such as an alkali battery, lithium battery, or the like, a secondary battery such as an NiCd battery, NiMH battery, Li Battery, or the like, an AC adapter, and the like.

Reference numerals 90 and 94 denote interfaces with recording media such as a memory card, hard disk, and the like; 92 and 96, connectors for connecting the recording media such as a memory card, hard disk, and the like; and 98, a recording medium attachment/detachment detection means for detecting whether or not the recording medium 200 or 210 is attached to the connector 92 and/or the connector 96.

Note that this embodiment has two sets of interfaces and connectors that receive the recording media. Of course, the number of sets of interfaces and connectors that receive the recording media is not particularly limited. Also, combinations of interfaces and connectors of different standards may be used. As the interface and connector, those complying with the standards of a PCMCIA card, CF (compact flash) card, and the like may be used.

Furthermore, when the interfaces 90 and 94, and connectors 92 and 96 use those complying with the standards of a PCMCIA card, CF (compact flash) card, and the like, various communication cards such as a LAN card, modem card, USB card, IEEE1394 card, P1284 card, SCSI card, PHS, and the like are connected thereto, image data and associated management information can be transferred between the image processing apparatus 100 and an external computer or its peripheral devices such as a printer and the like.

Reference numeral 102 denotes the protection means serving as a barrier which covers an image sensing unit including the lens 10 of the image processing apparatus 100 to protect it from contamination and damages.

Reference numeral 104 denotes the optical viewfinder, which allows image sensing using the optical viewfinder alone without using the electronic viewfinder function implemented by the image display unit 28. In the optical viewfinder 104, some functions of the indication unit 54, e.g., an in-focus indication, camera shake alert indication, flash charging indication, shutter speed indication, aperture value indication, exposure correction indication, and the like are placed.

Reference numeral 110 denotes a communication means having various communication functions such as RS232C, USB, IEEE1394, P1284, SCSI, modem, LAN, radio communication, and the like.

Reference numeral 112 denotes a connector or antenna (in case of a radio communication), which connects the image processing apparatus 100 to another device.

Reference numeral 200 denotes the recording medium such as a memory card, hard disk, or the like. The recording medium 200 comprises a recording unit 202 comprised of a semiconductor memory, magnetic disk, or the like, an interface 204 with the image processing apparatus 100, and a connector 206 for connecting the image processing apparatus 100.

Reference numeral 210 denotes the recording medium such as a memory card, hard disk, or the like. The recording medium 210 comprises a recording unit 212 comprised of a semiconductor memory, magnetic disk, or the like, an interface 214 with the image processing apparatus 100, and a connector 216 for connecting the image processing apparatus 100.

The operation of this embodiment will be explained below with reference to FIGS. 2, 3, 4, 5, and 6.

Figure 2:
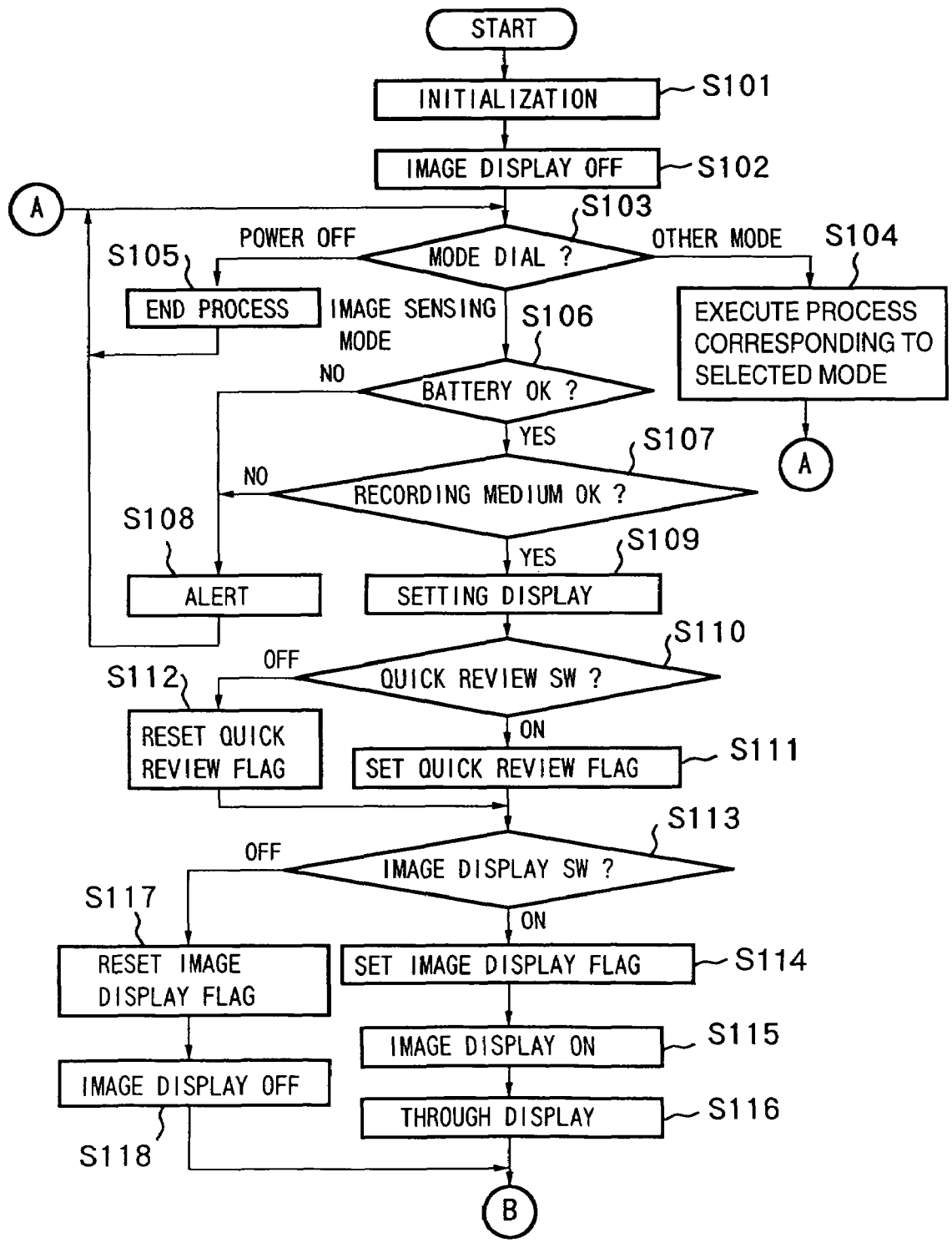
FIG. 2 is a flow chart showing a main routine of the first embodiment.
Figure 3:
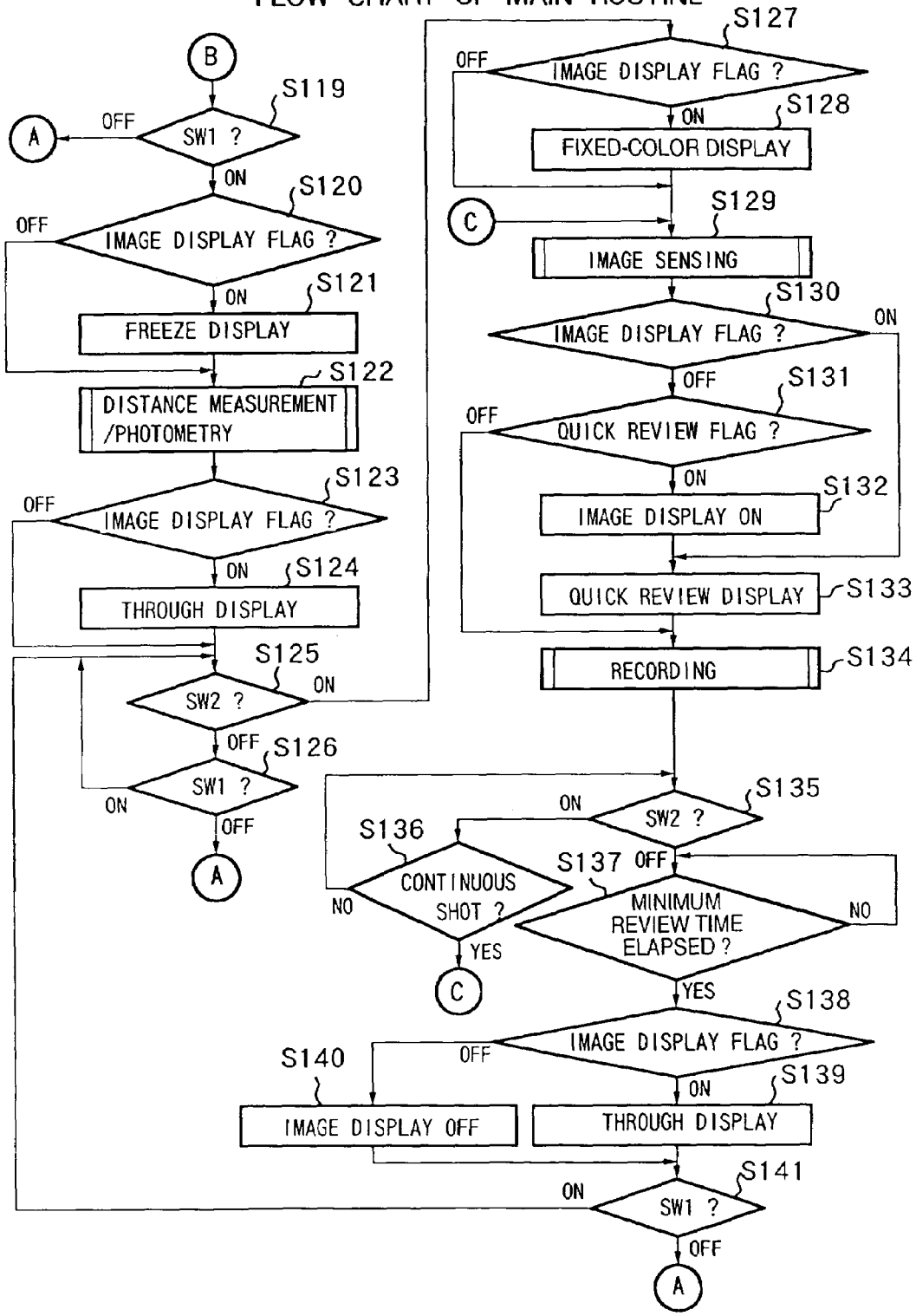
FIG. 3 is a flow chart showing the main routine of the first embodiment.

FIGS. 2 and 3 are flow charts showing the main routine of the image processing apparatus 100 of this embodiment. The operation of the image processing apparatus 100 will be described with the aid of FIGS. 2 and 3.

Upon power ON after battery exchange or the like, the system control circuit 50 initializes flags, control variables, and the like (S101), and resets image display of the image display unit 28 to an OFF state (S102).

The system control circuit 50 checks the setting position of the mode dial 60. If the mode dial 60 is set at a power OFF position (S103), the system control circuit 50 executes a predetermined end process (S105). More specifically, the system control circuit 50 changes the indications of the respective indication units to an end state, protects the image sensing unit by closing the barrier of the protection means 102, records required parameters and setting values including flags, control variables, and the like, and setting mode in the nonvolatile memory 56, cuts off unnecessary power supply to the respective units of the image processing apparatus 100 including the image display unit 28 by the power supply control means 80, and so forth. After that, the flow returns to step S103.

On the other hand, if the mode dial 60 is set at an image sensing mode position (S103), the flow advances to step S106.

If the mode dial is set at any of other mode positions (S103), the system control circuit 50 executes a process corresponding to the selected mode (S104), and the flow returns to step S103 upon completion of the process.

The system control circuit 50 checks using the power supply control means 80 if the remaining capacity and operation state of the power supply means 86 comprising batteries and the like pose any problem in the operation of the image processing apparatus 100 (S106). If a problem is found, a predetermined alert indication is made by means of an image and voice using the indication unit 54 (S108), and the flow then returns to step S103.

If no problem is found in the power supply means 86 (S106), the system control circuit 50 checks if the operation state of the recording medium 200 or 210 poses any problem in the operation of the image processing apparatus 100, in particular, recording/playback of image data to/from the recording medium (step S107). If any problem is found, a predetermined alert indication is made by means of an image and voice using the indication unit 54 (S108), and the flow then returns to step S103.

If no problem is found in the operation state of the recording medium 200 or 210 (S107), various setting states of the image display apparatus 100 are indicated by means of an image and voice using the indication unit 54 (S109). When the image display of the image display unit 28 is ON, various setting states of the image display apparatus 100 are indicated by means of an image and voice also using the image display unit 28.

The system control circuit 50 checks the setting state of the quick review ON/OFF switch 68 (S110). If the quick review mode is ON, the system control circuit 50 sets a quick review flag (S111); otherwise, it resets the quick review flag (S112).

Note that the status of the quick review flag is stored in an internal memory of the system control circuit 50 or the memory 52.

Subsequently, the system control circuit 50 checks the setting state of the image display ON/OFF switch 66 (S113). If the image display mode is ON, the system control circuit 50 sets an image display flag (S114), turns on the image display of the image display unit 28 (S115), and sets a through display state for displaying sensed image data in turn (S116). The flow then advances to step S119 (see FIG. 3).

In the through display state, data written in the image display memory 24 via the image sensing element 14, A/D converter 16, image processing circuit 20, and memory control circuit 22 are displayed on the image display unit 28 via the memory control circuit 22 and D/A converter 26, thus implementing the electronic viewfinder function.

If the image display ON/OFF switch 66 is set in an image display OFF mode (S113), the system control circuit 50 resets the image display flag (S117), and turns off the image display of the image display unit 28 (S118). Then, the flow advances to step S119.

When the image display is OFF, image sensing is done using the optical viewfinder 104 without using the electronic viewfinder function implemented by the image display unit 28. In this case, the power consumption of the image display unit 28, D/A converter 26, and the like, which consume large power, can be reduced.

Note that the status of the image display flag is stored in the internal memory of the system control circuit 50 or the memory 52.

If the shutter switch SW1 has not been pressed yet (S119), the flow returns to step S103.

If the shutter switch SW1 has been pressed (S119), the system control circuit 50 checks the status of the image display flag stored in its internal memory or the memory 52 (S120). If the image display flag is set, the system control circuit 50 sets the display state of the image display unit 28 in a freeze display state (S121), and the flow then advances to step S122.

In the freeze display state, image data on the image display memory 24 is inhibited from being rewritten via the image sensing element 14, A/D converter 16, image processing circuit 20, and memory control circuit 22, and the latest written image data is displayed on the image display unit 28 via the memory control circuit 22 and D/A converter 26, thus displaying a frozen image on the electronic viewfinder.

If the image display flag is reset (S120), the flow advances to step S122.

The system control circuit 50 executes a distance measurement to adjust the focus of the photographing lens 10 on an object, and determines the aperture value and shutter speed by photometry (S122). In photometry, the electronic flash is set up if necessary.

The distance measurement/photometry process (S122) will be described in detail later with reference to FIG. 4.

Upon completion of the distance measurement/photometry process (S122), the system control circuit 50 checks the status of the image display flag stored in its internal memory or the memory 52 (S123). If the image display flag is set, the system control circuit 50 sets the display state of the image display unit 28 in a through display state (S124), and the flow then advances to step S125. Note that the through display state in step S124 is the same operation state as that in step S116 (see FIG. 2).

If the shutter switch SW2 is not pressed (S125) and the shutter switch SW1 is canceled (S126), the flow returns to step S103.

If the shutter switch SW2 has been pressed (S125), the system control circuit 50 checks the status of the image display flag stored in its internal memory or the memory 52 (S127). If the image display flag is set, the system control circuit 50 sets the display state of the image display unit 28 in a fixed color display state (S128), and the flow then advances to step S129.

In the fixed color display state, in place of sensed image data, which has been written in the image display memory 24 via the image sensing element 14, A/D converter 16, image processing circuit 20, and memory control circuit 22, substitute fixed-color image data is displayed on the image display unit 28 via the memory control circuit 22 and D/A converter 26, thus displaying a fixed-color image on the electronic viewfinder 28.

If the image display flag is reset (S127), the flow advances to step S129.

The system control circuit 50 executes an image sensing process including an exposure process for writing sensed image data in the memory 30 via the image sensing element 14, A/D converter 16, image processing circuit 20, and memory control circuit 22 or directly from the A/D converter via the memory control circuit 22, and a development process for reading out image data written in the memory 30 and executing various processes of the readout image data using the memory control circuit 22 and the image processing circuit 20 if required (S129).

The image sensing process (S129) will be described in detail later with reference to FIG. 5.

The system controller 50 checks the status of the image display flag stored in its internal memory or the memory 52 (S130). If the image display flag is set, the system control circuit 50 performs a quick review display (S133). In this case, the image display unit 28 always displays an image as an electronic viewfinder even during image sensing, and a quick review display immediately after image sensing is also made.

If the image display flag is reset (S130), the system control circuit 50 checks the status of the quick review flag stored in its internal memory or the memory 52 (S131). If the quick review flag is set, the system control circuit 50 turns on the image display of the image display unit 28 (S132) to make a quick review display (S133).

In this case, even when the image display of the image display unit 28 is turned off to achieve power savings or to make image sensing using the optical viewfinder 104 without requiring any electronic viewfinder function, if the quick review function is set by the quick review switch, a sensed image can be automatically played back on the image display unit 28 immediately after image sensing, thus providing a function that is convenient for power savings and confirmation of the sensed image.

If the image display flag is reset (S130) and the quick review flag is also reset (S131), the flow advances to step S134 while the image display unit 28 is kept OFF. In this case, even after image sensing, the image display unit 28 is kept OFF, and no quick review display is made. This method is used when the sensed image need not be confirmed immediately after image sensing, and it is more important to attain power savings without using the electronic viewfinder function of the image display unit 28 like in a case wherein the user continues image sensing using the optical viewfinder 104.

The system control circuit 50 reads out sensed image data written in the memory 30, and executes various image processes using the memory control circuit 22 and the image processing circuit 20 if required, and image compression corresponding to the selected mode using the compression/expansion circuit 32. The system control circuit 50 then executes a recording process for writing image on the recording medium 200 or 210 (S134).

The recording process (S134) will be described in detail later with reference to FIG. 6.

Upon completion of the recording process (S134), if the shutter switch SW2 is kept pressed (S135), the system control circuit 50 checks the status of a continuous shot flag stored in its internal memory or the memory 52 (S136). If the continuous shot flag is set, the flow returns to step S129 to continuously make image sensing, and the next image sensing is made.

If the continuous shot flag is not set (S136), the current process repeats itself until the shutter switch SW2 is canceled.

In this manner, according to this embodiment, in an operation setup state that makes the quick review display immediately after image sensing, if the shutter switch SW2 is kept pressed upon completion of the recording process (S134), the quick review display on the image display unit 28 can continue until the shutter switch SW2 is released, and the user can carefully check the sensed image.

If the shutter switch SW2 is not pressed upon completion of the recording process (S134), or if the shutter switch SW2 is canceled after the sensed image is checked by holding down the shutter switch SW2 to continue the quick review display (S135), the flow advances to step S138 after an elapse of a predetermined minimum review time (S137).

As described above, according to this embodiment, since the quick review display on the image display unit 28 continues for a predetermined period of time, the user can reliably confirm the sensed image, and can be prevented from losing the next image sensing chance by continuing the quick review display for an unnecessarily long period of time.

Note that the setting method of this minimum review time is not particularly limited. That is, the minimum review time may be set at a fixed value, may be arbitrarily set by the user, or may be arbitrarily set or selected by the user within a predetermined range.

If the system control circuit 50 determines that the image display flag is set (S138), it sets the display state of the image display unit 28 in the through display state (S139), and the flow advances to step S141.

In this case, after the sensed image is confirmed by the quick review display on the image display unit 28, the through display state can be set to display sensed image data in turn for the next image sensing.

If the image display flag is reset (S138), the system control circuit 50 turns off the image display of the image display unit 28 (S140), and the flow advances to step S141.

In this case, after the sensed image is confirmed by the quick review display on the image display unit 28, the function of the image display unit 28 may be disabled to attain power savings, i.e., the consumption power of the image display unit 28, D/A converter 26, and the like that require large power can be reduced.

If the shutter switch SW1 has been pressed (S141), the flow returns to step S125 and the system control circuit 50 prepares for the next image sensing.

On the other hand, if the shutter switch SW1 is canceled (S141), the system control circuit 50 ends a series of image sensing operations, and the flow returns to step S103.

Figure 4:
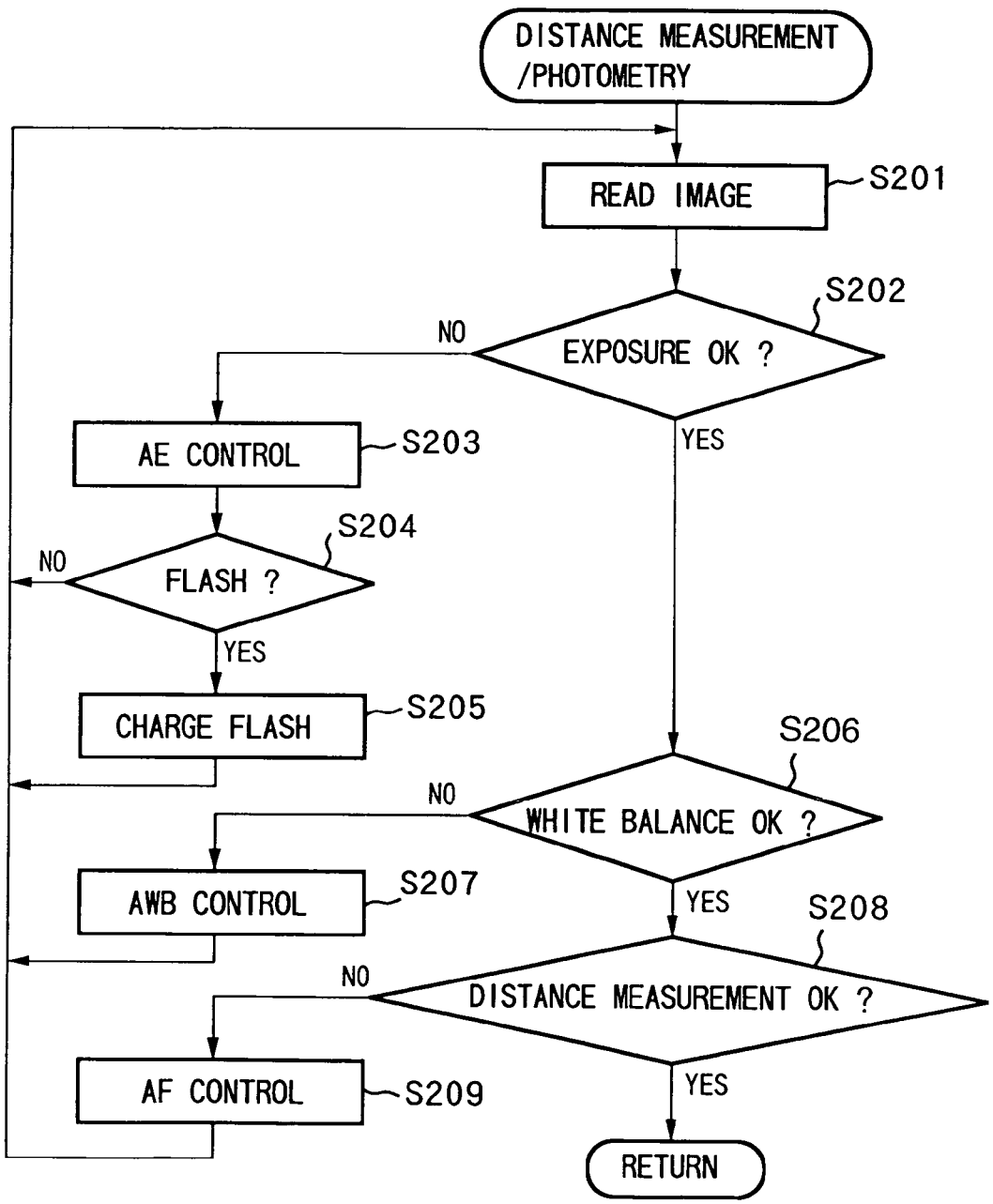
FIG. 4 is a flow chart showing a distance measurement/photometry process in detail.

FIG. 4 is a flow chart showing the distance measurement/photometry process in step S122 in FIG. 3 in detail.

The system control circuit 50 reads out a charge signal from the image sensing element 14, and the image processing circuit 20 sequentially reads sensed image data via the A/D converter 16 (S201). Using the read image data, the image processing circuit 20 makes predetermined computations used in the TTL AE (auto exposure), EF (flash pre-emission) process, and AF (auto focus) process. Note that the respective processes extract specific portions at required positions from all pixels, and use them in computations. In this manner, in the TTL AE, EF, AWB, and AF processes, optimal computations can be made in units of different modes, i.e., a center-weighted mode, average mode, evaluation mode, and the like.

The system control circuit 50 executes AE control using the exposure control means 40 using the computation results in the image processing circuit 20 (S203) until it is determined that the exposure value (AE) is appropriate (S202).

The system control circuit 50 checks using measurement data obtained by the AE control if flash emission is required (S204). If flash emission is required, the system control circuit 50 sets a flash flag, and charges the electronic flash 48 (S205).

If it is determined that the exposure value (AE) is appropriate (S202), the system control circuit 50 stores the measurement data and/or setting parameters in its internal memory or the memory 52.

Using the computation results in the image processing circuit 20 and the measurement data obtained by the AE control, the system control 50 executes AWB control by adjusting the color processing parameters using the image processing circuit 20 (S207) until it is determined that the white balance (AWB) is appropriate (S206).

If it is determined that the white balance (AWB) is appropriate (S206), the system control circuit 50 stores the measurement data and/or setting parameters in its internal memory or the memory 52.

Using the measurement data obtained by the AE control and AWB control, the system control circuit 50 executes AF control using the distance measurement control means 42 (S209) until it is determined that the distance measurement (AF) result indicates in-focus (S208).

If it is determined that the distance-measurement (AF) result indicates in-focus (S208), the system control circuit 50 stores the measurement data and/or setting parameters in its internal memory or the memory 52, thus ending the distance measurement/photometry process routine (S122).

Figure 5:
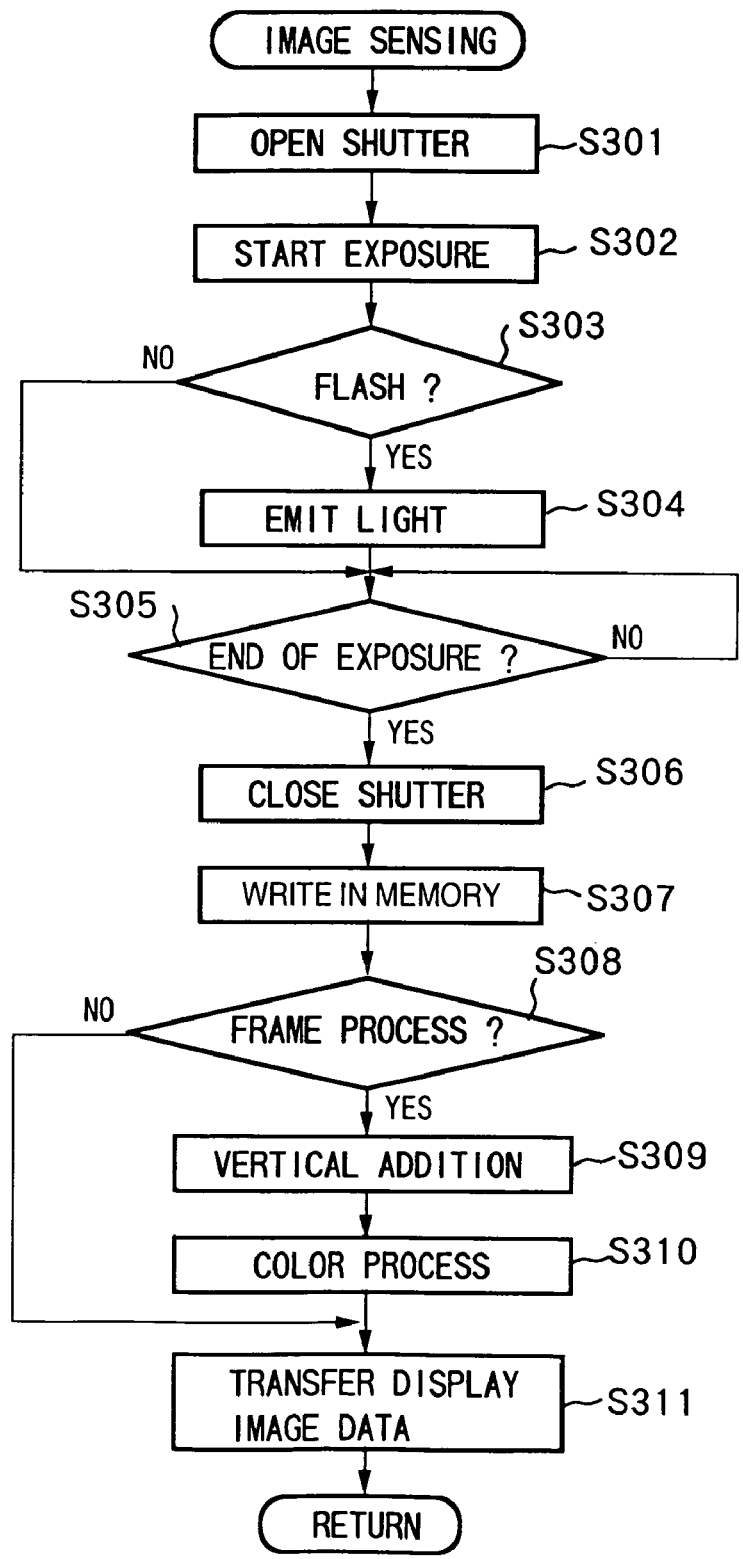
FIG. 5 is a flow chart showing an image sensing process in detail.

FIG. 5 is a flow chart showing the image sensing process in step S129 in FIG. 3 in detail.

The system control circuit 50 opens the shutter 12 having the stop function using the exposure control means 40 in accordance with photometry data stored in its internal memory or the memory 52 to expose the image sensing element 14 (S301, S302).

The system control circuit 50 checks based on the flash flag if the electronic flash 48 is required (S303). If the electronic flash 48 is required, the system control circuit 50 controls the electronic flash to emit light (S304).

The system control circuit 50 waits for completion of exposure of the image sensing element 14 in accordance with the photometry data (S305), closes the shutter 12 (S306), and reads a charge signal from the image sensing element 14 and writes sensed image data in the memory 30 via the A/D converter 16, image processing circuit 20, and memory control circuit 22 or directly from the A/D converter 16 via the memory control circuit 22 (S307).

If a frame process is required in correspondence with the selected image sensing mode (S308), the system control circuit 50 reads out image data written in the memory 30, executes a vertical addition process (S309) and color process (S310) in turn using the memory control circuit 22 and image processing apparatus 20 if required, and writes the processed image data in the memory 30.

The system control circuit 50 reads out image data from the memory 30, and transfers display image data to the image display memory 24 via the memory control circuit 22 (S311).

Upon completion of a series of processes, the image sensing process routine (S129) ends.

Figure 6:
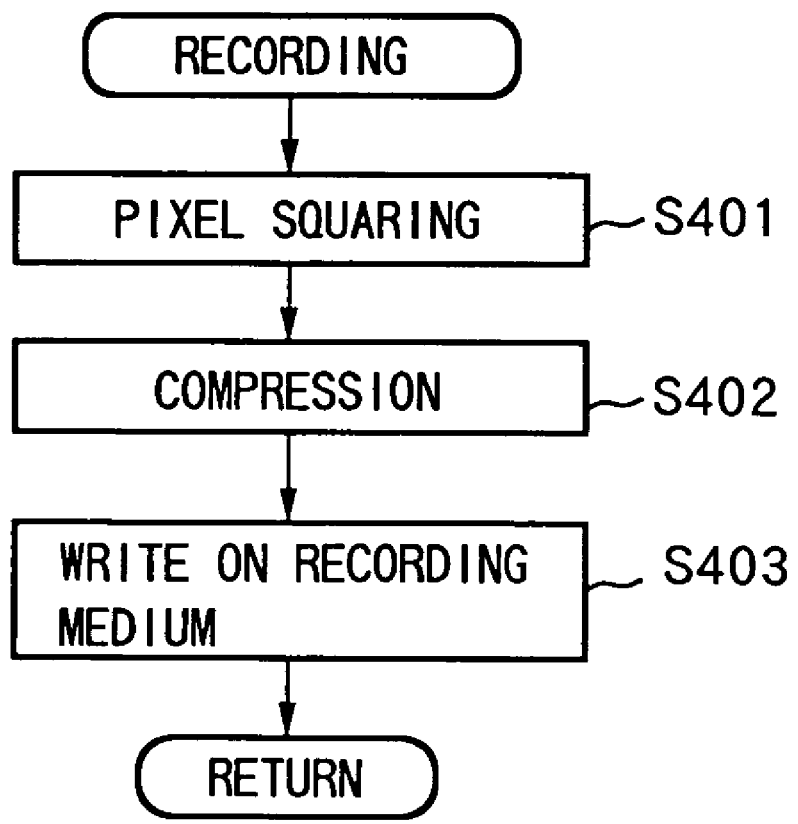
FIG. 6 is a flow chart showing a recording process in detail.

FIG. 6 is a flow chart showing the recording process in step S134 in FIG. 3 in detail.

The system control circuit 50 executes a pixel squaring process for reading out sensed image data written in the memory 30, and converting the vertical-to-horizontal pixel ratio of the image sensing element to 1:1 by interpolation using the memory control circuit 22 and image processing circuit 20 if required (S401). The system control circuit 50 then writes the processed image data in the memory 30.

The system control circuit 50 reads out image data written in the memory 30, and executes image compression corresponding to the selected mode using the compression/expansion circuit 32 (S402). After that, the system control circuit 50 writes the compressed image data in the recording medium 200 or 210 such as a memory card, compact flash card, or the like via the interface 90 or 94, and the connector 92 or 96 (S403).

Upon completion of a write in the recording medium, the recording process routine (S134) ends.

The first embodiment of the present invention has been explained using FIG. 1.

In the description of the embodiment, when the image display unit 28 is turned off, all building components of the image display unit 28 are turned off, but only some building components of the image display unit 28 may be turned off. In such case, a function that can attain both confirmation of the sensed image and power savings can be implemented. For example, when the image display unit 28 is comprised of an LCD and backlight, the backlight alone may be turned off while the LCD is kept ON, thus implementing the function that can attain both confirmation of the sensed image and power savings as in the description of the embodiment.

The image display ON/OFF switch 66 and quick review ON/OFF switch 68 are independently equipped. However, the image display ON/OFF switch 66 and quick review ON/OFF switch 68 may be combined into a single, common switch, and that switch may have three positions, i.e., image display ON/image display ON for quick review alone/image display OFF.

In the above description, upon reception of an end instruction of the quick review display on the image display unit 28, an elapse of the minimum review time in which the quick review display continues for a minimum period of time is checked. However, no minimum review time may be set. In such case, in the flow chart in FIG. 3, step S137 of checking an elapse of the minimum review time is omitted.

Also, dedicated image display units for the through display and quick review display may be equipped, and may be turned on/off in correspondence with the setups of the image display ON/OFF switch and quick review ON/OFF switch, respectively. In this case as well, the function that can attain both confirmation of the sensed image and power savings can be implemented as in the description of the embodiment.

In the above description, when the image display ON/OFF switch is ON, the quick review display immediately after image sensing is made irrespective of the setups of the quick review ON/OFF switch. However, when the image display ON/OFF switch is ON, whether or not the quick review display is made may be determined in correspondence with the setups of the quick review ON/OFF switch.

Note that the recording media 200 and 210 are not limited to memory cards such as PCMCIA cards, compact flash cards, or the like, hard disks, and the like, but may use micro DATS, magnetooptical disks, optical disks such as CD-Rs, CD-WRs, or the like, phase change optical disks such as DVDs, and the like.

Also, the recording media 200 and 210 may use hybrid media that integrate memory cards, hard disks, and the like. Furthermore, such hybrid media may include detachable media.

In the description of the embodiment, the recording media 200 and 210 are independent from the image processing apparatus 100 and are arbitrarily connectable. One or both the recording media 200 and 210 may be permanently connected to the image processing apparatus 100.

An arbitrary number (one or a plurality) of image recording media 200 or 210 may be connectable to the image processing apparatus 100.

In the above description, the recording media 200 and 210 are attached to the image processing apparatus. However, one or a combination of a plurality of recording media may be used.

To restate, according to the first embodiment, a sensed image can be confirmed without considerably reducing the operable time and the number of images that can be sensed.

Second Embodiment

Figure 7:
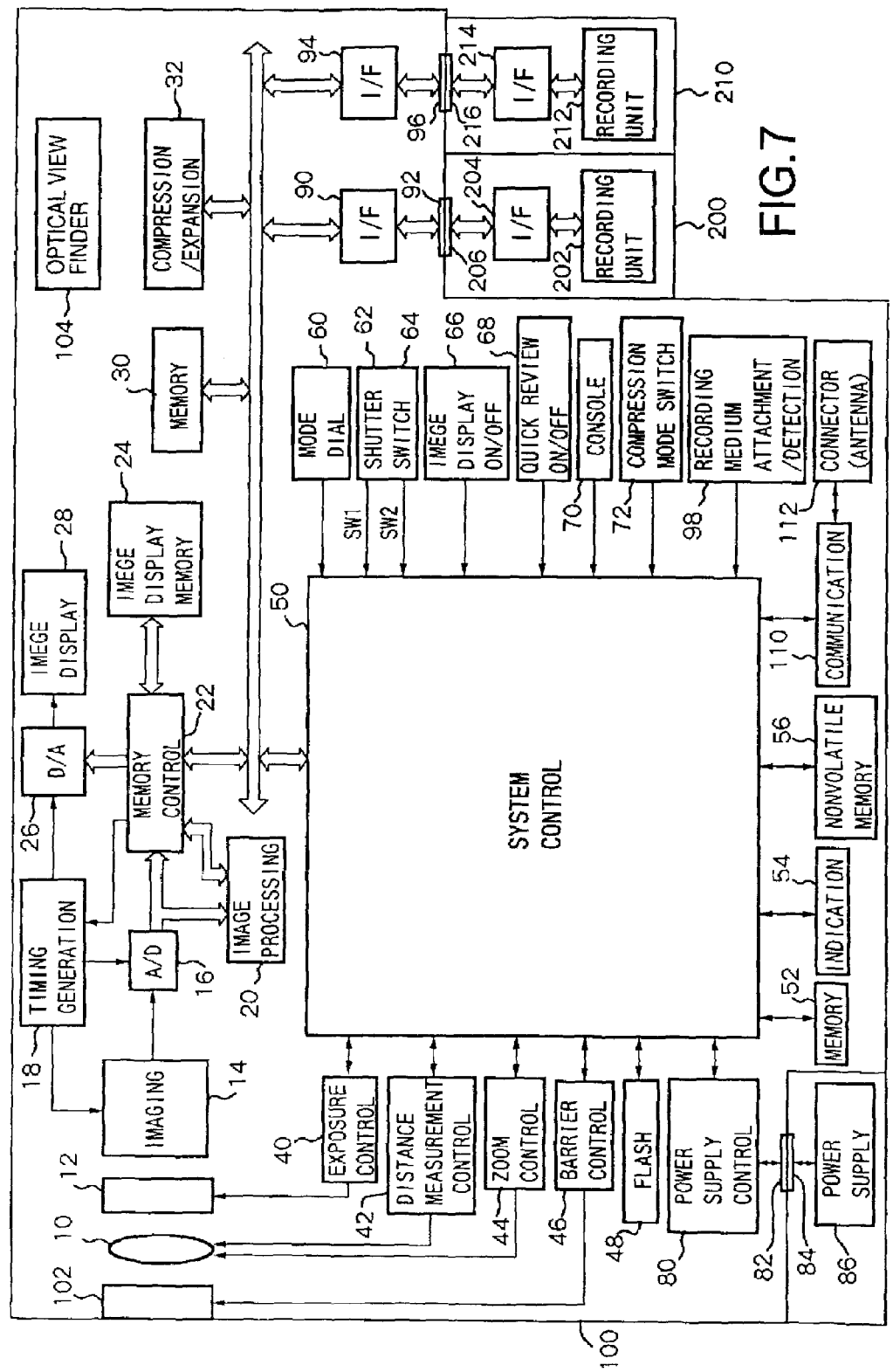
FIG. 7 is a block diagram showing the arrangement according to the second embodiment of the present invention.

The arrangement of an image sensing apparatus of the second embodiment shown in FIG. 7 is substantially the same as that of the first embodiment shown in FIG. 1 on the block diagrams, except that it has a compression mode switch 72. Since the operation of the second embodiment is different from the first embodiment, only differences from the first embodiment will be explained below.

Referring to FIG. 7, reference numeral 72 denotes the compression mode switch, which is used for selecting the compression ratio of JPEG compression or selecting a CCDRAW mode for directly recording a signal output from the image sensing element 14 and converted into a digital signal on a recording medium.

The JPEG compression mode includes, e.g., a normal mode and fine mode.

In the JPEG compression mode, image data, which is read out from the image sensing element 14 and is written in the memory 30 via the A/D converter 16, image processing circuit 20, and memory control circuit 22, is read out, and is compressed at the selected compression ratio by the compression/expansion circuit 32. After that, the compressed image data is recorded on the recording medium 200 or 210.

In the CCDRAW mode, image data, which is directly read out in units of lines in correspondence with the pixel formats of color filters of the image sensing element 14, and is written in the memory 30 via the A/D converter 16 and memory control circuit 22, is read out, and is recorded on the recording medium 200 or 210.

The operation of this embodiment will be explained below with reference to FIGS. 8, 9, 10, 5, 11, 12, and 13.

Figure 8:
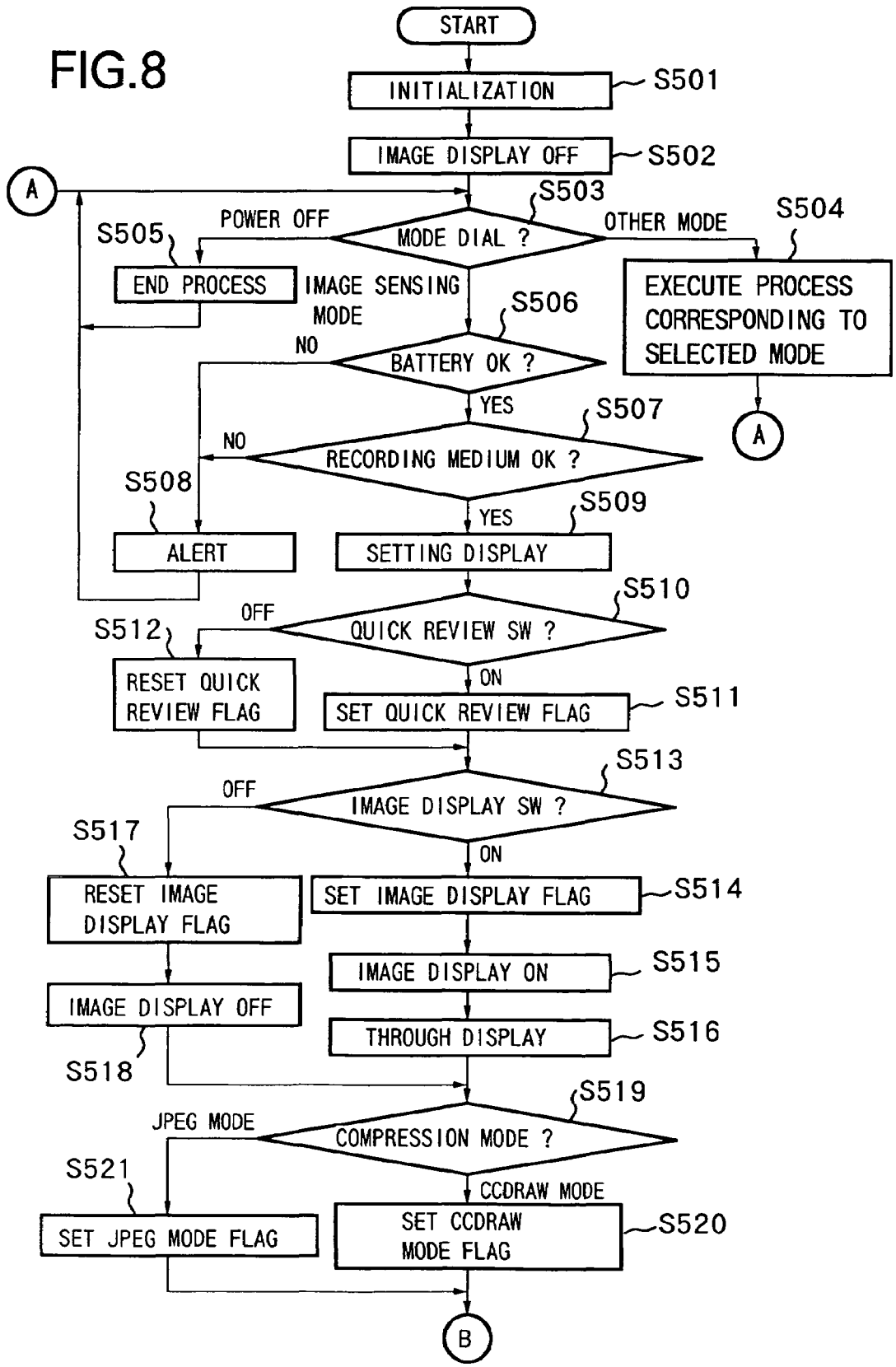
FIG. 8 is a flow chart showing a main routine of the second embodiment.
Figure 9:
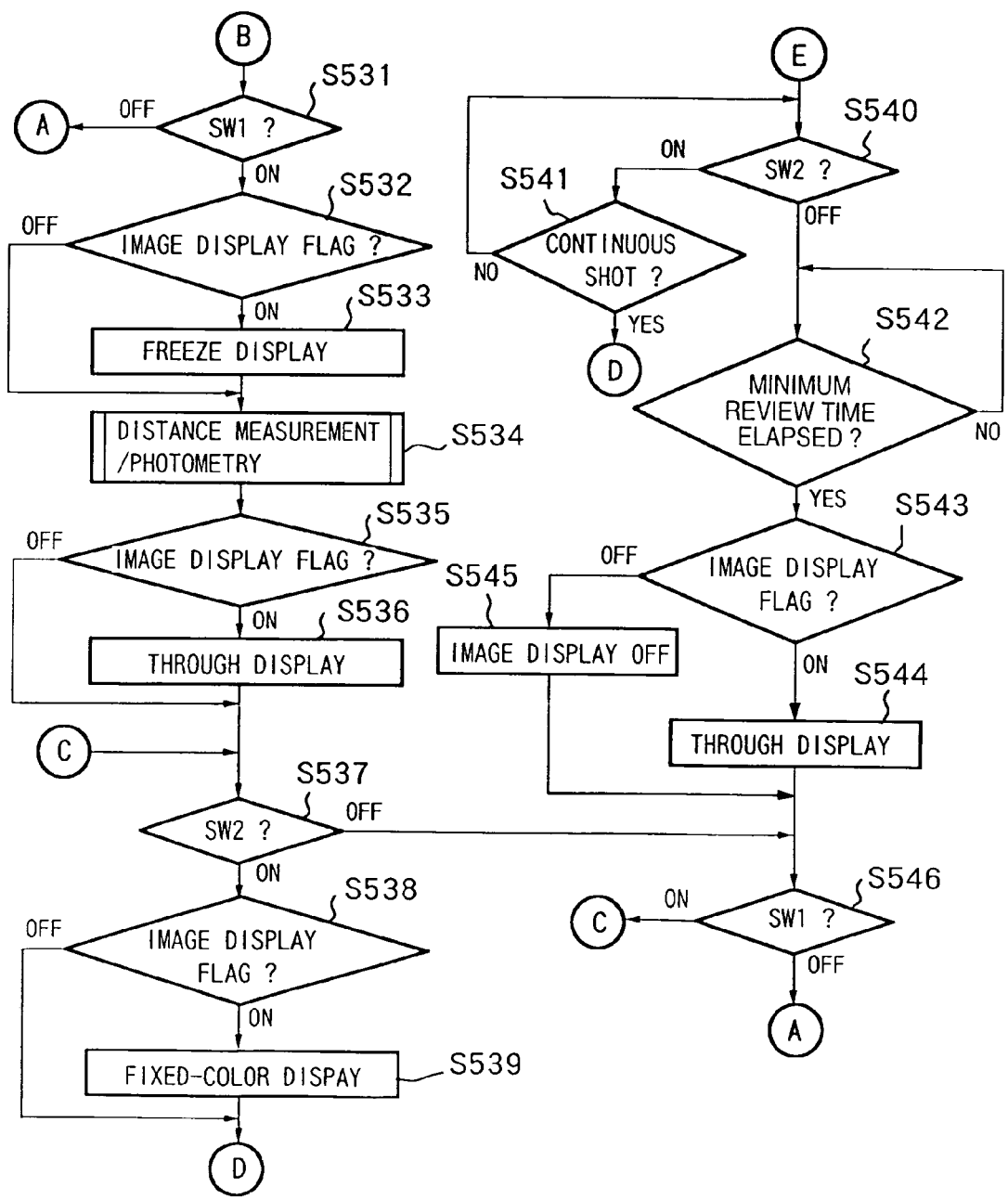
FIG. 9 is a flow chart showing the main routine of the second embodiment.
Figure 10:
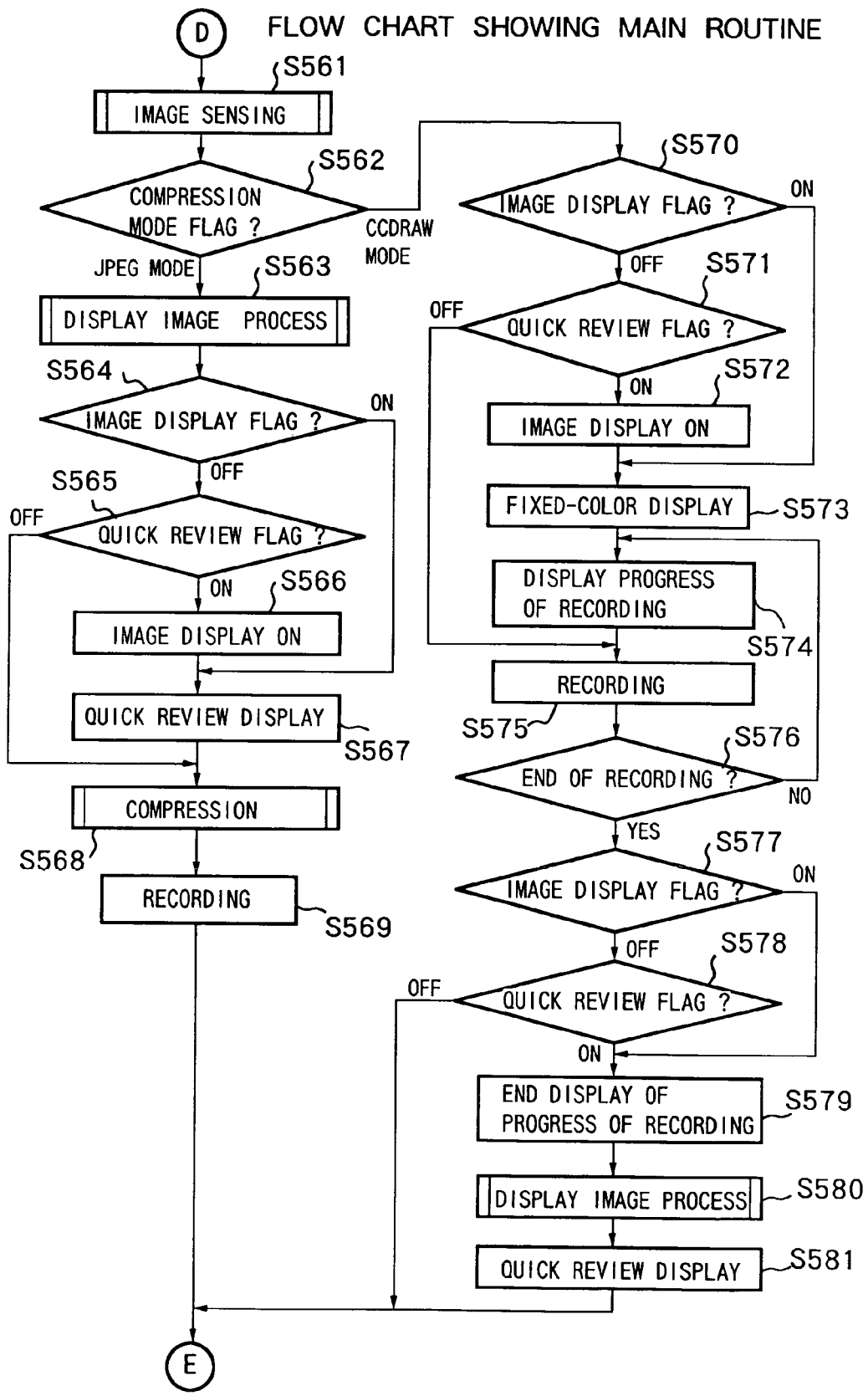
FIG. 10 is a flow chart showing the main routine of the second embodiment.

FIGS. 8, 9, and 10 are flow charts showing the main routine of an image processing apparatus 300 of this embodiment. The operation of the image processing apparatus 300 will be described below using FIGS. 8, 9, and 10.

Upon power ON after battery exchange or the like, the system control circuit 50 initializes flags, control variables, and the like (S501), and resets image display of the image display unit 28 to an OFF state (S502).

The system control circuit 50 checks the setting position of the mode dial 60. If the mode dial 60 is set at a power OFF position (S503), the system control circuit 50 executes a predetermined end process (S505). More specifically, the system control circuit 50 changes the indications of the respective indication units to an end state, protects the image sensing unit by closing the barrier of the protection means 102, records required parameters and setting values including flags, control variables, and the like, and the setting mode in the nonvolatile memory 56, cuts off unnecessary power supply to the respective units of the image processing apparatus 300 including the image display unit 28 by the power supply control means 80, and so forth. After that, the flow returns to step S503.

On the other hand, if the mode dial 60 is set at an image sensing mode position (S503), the flow advances to step S506.

If the mode dial is set at any of other mode positions (S503), the system control circuit 50 executes a process corresponding to the selected mode (S504), and the flow returns to step S503 upon completion of the process.

The system control circuit 50 checks using the power supply control means 80 if the remaining capacity and operation state of the power supply means 86 comprising batteries and the like pose any problem in the operation of the image processing apparatus 300 (S506). If a problem is found, a predetermined alert indication is made by means of an image or voice using the indication unit 54 (S508), and the flow then returns to step S503.

If no problem is found in the power supply means 86 (S506), the system control circuit 50 checks if the operation state of the recording medium 200 or 210 poses any problem in the operation of the image processing apparatus 300, in particular, recording/playback of image data to/from the recording medium (step S507). If any problem is found, a predetermined alert indication is made by means of an image or voice using the indication unit 54 (S508), and the flow then returns to step S503.

If no problem is found in the operation state of the recording medium 200 or 210 (S507), various setting states of the image display apparatus 300 are indicated by means of an image or voice using the indication unit 54 (S509). When the image display of the image display unit 28 is ON, various setting states of the image display apparatus 300 are indicated by means of an image or voice also using the image display unit 28.

The system control circuit 50 checks the setting state of the quick review ON/OFF switch 68 (S510). If the quick review mode is ON, the system control circuit 50 sets a quick review flag (S511); otherwise, it resets the quick review flag (S512).

Note that the status of the quick review flag is stored in an internal memory of the system control circuit 50 or the memory 52.

Subsequently, the system control circuit 50 checks the setting state of the image display ON/OFF switch 66 (S513). If the image display mode is ON, the system control circuit 50 sets an image display flag (S514), turns on the image display of the image display unit 28 (S515), and sets a through display state for displaying sensed image data in turn (S516). The flow then advances to step S519.

In the through display state, data written in turn in the image display memory 24 via the image sensing element 14, A/D converter 16, image processing circuit 20, and memory control circuit 22 are displayed in turn on the image display unit 28 via the memory control circuit 22 and D/A converter 26, thus implementing the electronic viewfinder function.

If the image display ON/OFF switch 66 is set in an image display OFF mode (S513), the system control circuit 50 resets the image display flag (S517), and turns off the image display of the image display unit 28 (S518). Then, the flow advances to step S519.

When the image display is OFF, image sensing is done using the optical viewfinder 104 without using the electronic viewfinder function implemented by the image display unit 28. In this case, the power consumption of the image display unit 28, D/A converter 26, and the like, which consume large power, can be reduced.

Note that the status of the image display flag is stored in the internal memory of the system control circuit 50 or the memory 52.

The system control circuit 50 then checks the setup state of the compression mode switch 72 (S519). If the image compression mode is set in the CCDRAW mode, the system control circuit 50 sets a CCDRAW mode flag (S520), and the flow advances to step S531 (see FIG. 9).

In the CCDRAW mode, image data, which is directly read out in units of lines in correspondence with the pixel formats of color filters of the image sensing element 14, and is written in the memory 30 via the A/D converter 16 and memory control circuit 22, is read out, and is recorded on the recording medium 200 or 210.

Since the CCDRAW mode can directly record an image signal captured by the image sensing element 14 on the recording medium, high-quality recording can be achieved but the image data size to be recorded becomes large.

If the compression mode switch 72 is set in the JPEG mode (S519), the system control circuit 50 sets a JPEG mode flag (S521), and the flow advances to step S531.

In the JPEG mode, image data, which is read out from the image sensing element 14 and is written in the memory 30 via the A/D converter 16, image processing circuit 20, and memory control circuit 20, is read out, and is compressed at the selected compression ratio by the compression/expansion circuit 32. After that, the compressed image data is recorded on the recording medium 200 or 210.

Since the JPEG mode can compress and record an image signal captured by the image sensing element 14 on the recording medium, more image signals can be recorded by reducing each image data size to be recorded. However, when image compression uses JPEG as irreversible compression, the image quality deteriorates in correspondence with the compression ratio.

Note that the status of the compression mode flag is stored in the internal memory of the system control circuit 50 or the memory 52.

If the shutter switch SW1 has not been pressed yet (S531; see FIG. 9), the flow returns to step S503.

If the shutter switch SW1 has been pressed (S531), the system control circuit 50 checks the status of the image display flag stored in its internal memory or the memory 52 (S532). If the image display flag is set, the system control circuit 50 sets the display state of the image display unit 28 in a freeze display state (S533), and the flow then advances to step S534.

In the freeze display state, image data on the image display memory 24 is inhibited from being rewritten via the image sensing element 14, A/D converter 16, image processing circuit 20, and memory control circuit 22, and the latest written image data is displayed on the image display unit 28 via the memory control circuit 22 and D/A converter 26, thus displaying a frozen image on the electronic viewfinder.

If the image display flag is reset (S532), the flow advances to step S534.

The system control circuit 50 executes a distance measurement to adjust the focus of the photographing lens 10 on an object, and determines the aperture value and shutter speed by photometry (S534). In photometry, the electronic flash is set up if necessary. The details of the distance measurement/photometry process (S534) are the same as those that have already described in the first embodiment using FIG. 4, and a detailed description thereof will be omitted.

Upon completion of the distance measurement/photometry process (S534), the system control circuit 50 checks the status of the image display flag stored in its internal memory or the memory 52 (S535). If the image display flag is set, the system control circuit 50 sets the display state of the image display unit 28 in a through display state (S536), and the flow then advances to step S537. Note that the through display state in step S536 is the same operation state as that in step S516 (see FIG. 8).

If the shutter switch SW2 is not pressed (S537) and the shutter switch SW1 is canceled (S546), the flow returns to step S503.

If the shutter switch SW2 has been pressed (S537), the system control circuit 50 checks the status of the image display flag stored in its internal memory or the memory 52 (S538). If the image display flag is set, the system control circuit 50 sets the display state of the image display unit 28 in a fixed color display state (S539), and the flow then advances to step S561 (see FIG. 10).

In the fixed color display state, in place of sensed image data, which has been written in the image display memory 24 via the image sensing element 14, A/D converter 16, image processing circuit 20, and memory control circuit 22, substitute fixed-color image data is displayed on the image display unit 28 via the memory control circuit 22 and D/A converter 26, thus displaying a fixed-color image on the electronic viewfinder 28.

If the image display flag is reset (S538), the flow advances to step S561.

The system control circuit 50 executes an image sensing process including an exposure process for writing sensed image data in the memory 30 via the image sensing element 14, A/D converter 16, image processing circuit 20, and memory control circuit 22 or directly from the A/D converter via the memory control circuit 22, and a development process for reading out image data written in the memory 30 and executing various processes of the readout image data using the memory control circuit 22 and the image processing circuit 20 if required (S561).

The image sensing process (S561) will be explained in detail later using FIG. 11.

Upon completion of the image sensing process (S561), the system control circuit 50 checks the status of the compression mode flag stored in its internal memory or the memory 52 (S562).

<When Compression Mode Flag=JPEG Mode>

If the status of the compression mode flag indicates the JPEG mode (S562), a display image process for reading out the image data written in the memory 30 by the image sensing process (S561), and transferring that data to the image display memory 24 via the memory control circuit 22 is executed (S563).

The display image process (S563) will be explained in detail later with reference to FIG. 12.

The system controller 50 checks the status of the image display flag stored in its internal memory or the memory 52 (S564). If the image display flag is set, the system control circuit 50 performs a quick review display (S565). In this case, the image display unit 28 always displays an image as an electronic viewfinder even during image sensing, and a quick review display immediately after image sensing is also made.

If the image display flag is reset (S564), the system control circuit 50 checks the status of the quick review flag stored in its internal memory or the memory 52 (S565). If the quick review flag is set, the system control circuit 50 turns on the image display of the image display unit 28 (S566) to make a quick review display (S567).

In this case, even when image display of the image display unit 28 is turned off to achieve power savings or to make image sensing using the optical viewfinder 104 without requiring any electronic viewfinder function, if the quick review function is set by the quick review switch 68, a sensed image can be automatically played back on the image display unit 28 immediately after image sensing, thus providing a function that is convenient for power savings and confirmation of the sensed image.

If the image display flag is reset (S564) and the quick review flag is also reset (S565), the flow advances to step S568 while the image display unit 28 is kept OFF. In this case, even after image sensing, the image display unit 28 is kept OFF, and no quick review display is made. This method is used when the sensed image need not be confirmed immediately after image sensing, and it is more important to attain power savings without using the electronic viewfinder function of the image display unit 28 like in a case wherein the user continues image sensing using the optical viewfinder 104.

The system control circuit 50 reads out sensed image data written in the memory 30, and executes various image processes using the memory control circuit 22 and the image processing circuit 20 if required, and a compression process that executes image compression corresponding to the selected mode using the compression/expansion circuit 32 (S568). The system control circuit 50 then executes a recording process for writing image on the recording medium 200 or 210 (S569).

The compression process (S568) will be described in detail later using FIG. 13.

When the image display unit 28 is ON, a message such as "BUSY" or the like that indicates a write in progress is displayed on the image display unit 28 during a write of image data on the recording medium 200 or 210.

Furthermore, the indication unit 54 makes a recording medium write access indication by flickering an LED or the like in combination with the above message.

After the recording process (S569), the flow advances to step S540 (see FIG. 9).

<When Compression Mode Flag=CCDRAW mode>

If the status of the compression mode flag indicates the CCDRAW mode (S562), the system control circuit 50 checks the status of the image display flag stored in its internal memory or the memory 52 (S570). If the image display flag is set, the system control circuit 50 sets the display state of the image display unit 28 in the fixed-color display state (S573), and the flow advances to step S574.

In this case, by setting the image display unit 28 in the fixed-color display state, the system control circuit 50 can display progress of recording in the recording process (S575; to be described later) on the image display unit 28.

Since the recording process in the CCDRAW mode can directly record an image signal captured by the image sensing element 14 on the recording medium, high-quality recording can be achieved but the image data size to be recorded becomes large. For this reason, displaying progress of recording is convenient for the user.

If the image display flag is reset (S570), the system control circuit 50 checks the status of the quick review flag stored in its internal memory or the memory 52 (S571). If the quick review flag is set, the system control circuit 50 turns on the image display of the image display unit 28 (S572), and sets the display state of the image display unit 28 in the fixed-color display state (S573). Then, the flow advances to step S54.

In this case as well, by setting the image display unit 28 in the fixed-color display state, the system control circuit 50 can display progress of recording in the recording process (S575; to be described later) on the image display unit 28.

If the image display flag is reset (S570) and the quick review flag is also reset (S571), the flow advances to step S575 while the image display unit 28 is kept OFF. In this case, the recording process (S575; to be described later) is executed without displaying any recording progress state on the image display unit 28.

The system control circuit 50 reads out image data, which was directly read out in units of lines in correspondence with the pixel formats of the color filters of the image sensing element 14 and was written in the memory 30 via the A/D converter 16 and memory control circuit 22 in the image sensing process in step S561, and records it on the recording medium 200 or 210 such as a memory card, compact flash card, or the like via the interface 90 or 94, and the connector 92 or 96 (S575), while displaying the progress of the recording process in step S575 on the image display unit 28 (S574).

When the image display unit 28 is ON, a message such as "BUSY" or the like that indicates a write in progress is displayed on the image display unit 28 during a write of image data on the recording medium 200 or 210.

Furthermore, the indication unit 54 makes a recording medium write access indication by flickering an LED or the like in combination with the above message.

This recording process in step S575 is executed until recording on the recording medium 200 or 210 is completed (S576) while updating the display of the recording progress state when the image display of the image display unit 28 is ON (S574).

Upon completion of the recording process (S576), the system control circuit 50 checks the status of the image display flag stored in its internal memory or the memory 52 (S577). If the image display flag is set, the flow advances to step S579.

If the image display flag is reset (S577), the system control circuit 50 checks the status of the quick review flag stored in its internal memory or the memory 52 (S578). If the quick review flag is set, the flow advances to step S579.

If the image display flag is reset (S577) and the quick review flag is also reset (S578), the flow advances to step S540 (see FIG. 9) while the image display unit 28 is kept OFF.

Upon completion of the display of the recording progress state on the image display unit 28 (S579), the system control circuit 50 executes a display image process for reading out image data, which was directly read out in units of lines in correspondence with the pixel formats of the color filters of the image sensing element 14 and was written in the memory 30 via the A/D converter 16 and memory control circuit 22 in the image sensing process in step S561, executing various processes of the readout data using the image processing circuit 20, and transferring the processed data to the image display memory 24 via the memory control circuit 22 (S580). With this display image process, when the image display unit 28 is ready to playback a sensed image, the quick review display is made (S581).

The display image process (S580) will be explained in detail later with reference to FIG. 12.

As described above, according to this embodiment, immediately after the image sensing/recording process in the CCDRAW mode, the display image process is executed to automatically play back a sensed image on the image display unit 28. In addition, since the progress of recording is displayed during image data recording, a function that is convenient for confirmation of the sensed image and confirmation associated jobs can be provided.

Also, even when the image display of the image display unit 28 is turned off to achieve power savings or to make image sensing using the optical viewfinder 104 without requiring any electronic viewfinder function, if the quick review function is set by the quick review switch, a sensed image can be automatically played back on the image display unit 28 immediately after image sensing and recording, thus providing a function that is convenient for power savings and confirmation of a sensed image.

After the quick review display (S581), the flow advances to step S540.

Upon completion of a series of processes (S563 to S569) in the JPEG mode or a series of processes (S570 to S581) in the CCDRAW mode, if the shutter switch SW2 has been pressed (S540; see FIG. 9), the system control circuit 50 checks the status of a continuous shot flag stored in its internal memory or the memory 52 (S541). If the continuous shot flag is set, the flow returns to step S561 to continuously make image sensing, and the next image sensing is done.

If the continuous shot flag is not set (S541), the current process repeats itself until the shutter switch SW2 is released (S540).

As described above, according to this embodiment, in an operation setup state that makes the quick review display immediately after image sensing, if the shutter switch SW2 is kept pressed upon completion of the recording process (S569, S575), the quick review display on the image display unit 28 can continue until the shutter switch SW2 is released, and the user can carefully check the sensed image.

If the shutter switch SW2 is not pressed upon completion of a series of processes (S563 to S569) in the JPEG mode or a series of processes (S570 to S581) in the CCDRAW mode, or if the shutter switch SW2 is released after the sensed image is checked by holding down the shutter switch SW2 to continue the quick review display (S540), the flow advances to step S543 after an elapse of a predetermined minimum review time (S542).

As described above, according to this embodiment, since the quick review display on the image display unit 28 continues for a predetermined period of time, the user can reliably confirm the sensed image, and can be prevented from losing the next image sensing chance by continuing the quick review display for an unnecessarily long period of time.

Note that the setting method of this minimum review time is not particularly limited. That is, the minimum review time may be set at a fixed value, may be arbitrarily set by the user, or may be arbitrarily set or selected by the user within a predetermined range.

If the system control circuit 50 determines that the image display flag is set (S543), it sets the display state of the image display unit 28 in the through display state (S544), and the flow advances to step S546.

In this case, after the sensed image is confirmed by the quick review display on the image display unit 28, the through display state can be set to display sensed image data in turn for the next image sensing.

If the image display flag is reset (S543), the system control circuit 50 turns off the image display of the image display unit 28 (S545), and the flow advances to step S546.

In this case, after the sensed image is confirmed by the quick review display on the image display unit 28, the function of the image display unit 28 is disabled to attain power savings, i.e., the consumption power of the image display unit 28, D/A converter 26, and the like that require large power can be reduced.

If the shutter switch SW1 has been pressed (S546), the flow returns to step S537 and the system control circuit 50 prepares for the next image sensing.

On the other hand, if the shutter switch SW1 is released (S546), the system control circuit 50 ends a series of image sensing operations, and the flow returns to step S503.

Figure 11:
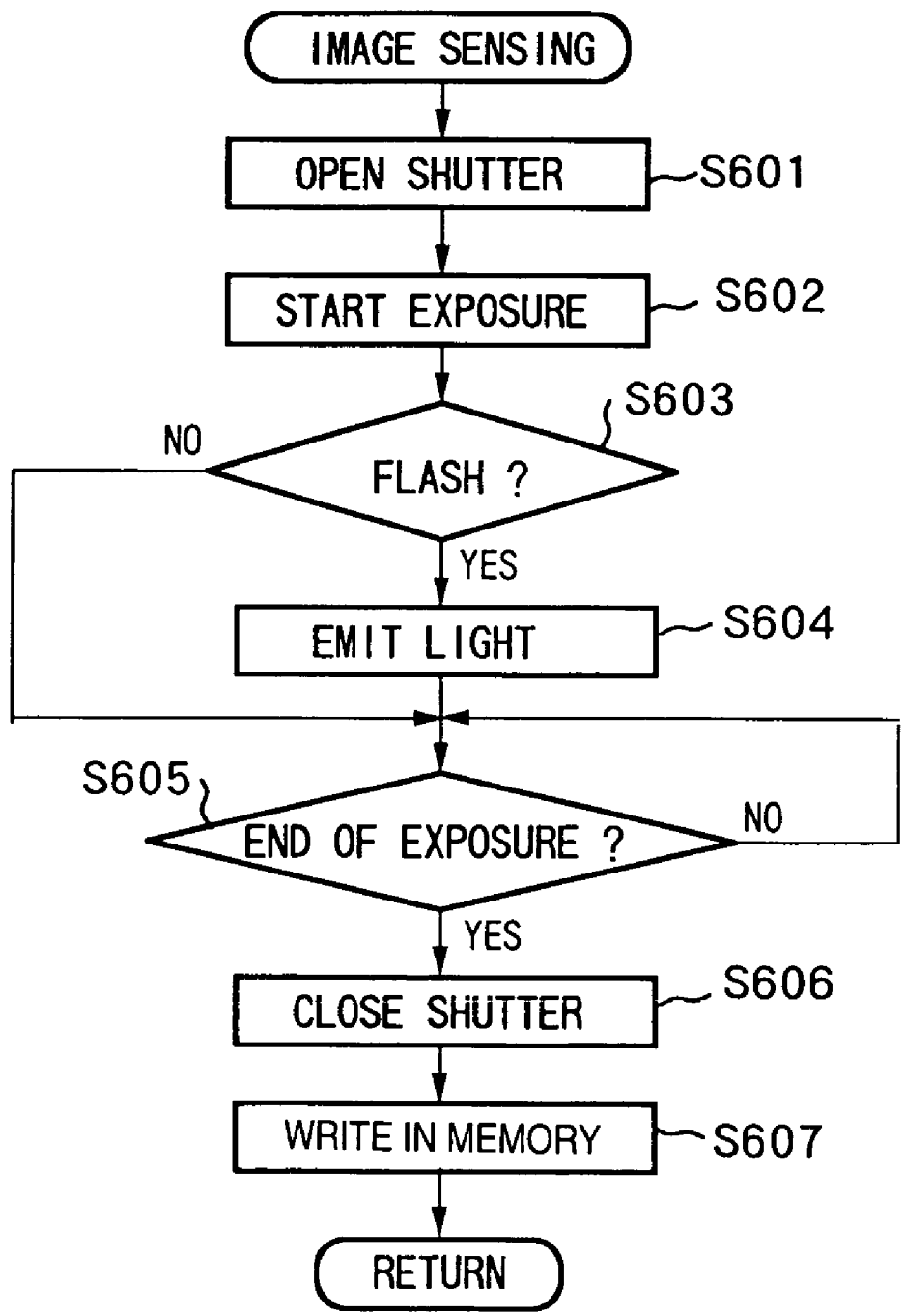
FIG. 11 is a flow chart showing an image sensing process in detail.

FIG. 11 is a flow chart showing the image sensing process in step S561 in FIG. 10 in detail. The system control circuit 50 opens the shutter 12 having the stop function using the exposure control means 40 in accordance with photometry data stored in its internal memory or the memory 52 to expose the image sensing element 14 (S601, S602).

The system control circuit 50 checks based on the flash flag if the electronic flash 48 is required (S603). If the electronic flash 48 is required, the system control circuit 50 controls the electronic flash to emit light (S604).

The system control circuit 50 waits for completion of exposure of the image sensing element 14 in accordance with the photometry data (S605), closes the shutter 12 (S606), and reads a charge signal from the image sensing element 14 and writes sensed image data in the memory 30 via the A/D converter 16, image processing circuit 20, and memory control circuit 22 or directly from the A/D converter 16 via the memory control circuit 22 (S607). Upon completion of a series of processes, the image sensing process routine in step S561 ends.

Figure 12:
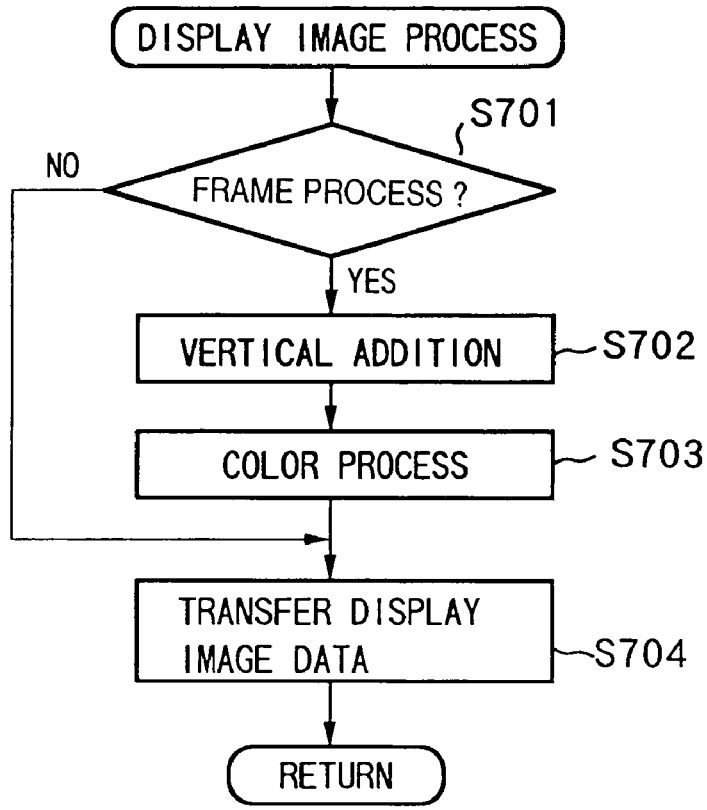
FIG. 12 is a flow chart showing a display image process in detail.

FIG. 12 is a flow chart showing the display image process in step S563 or S580 in FIG. 10 in detail.

If a frame process is required in correspondence with the selected image sensing mode (S701), the system control circuit 50 reads out image data written in the memory 30, executes a vertical addition process (S702) and color process (S703) in turn using the memory control circuit 22 and image processing apparatus 20 if required, and writes the processed image data in the memory 30.

The system control circuit 50 reads out image data from the memory 30, and transfers display image data to the image display memory 24 via the memory control circuit 22 (S704).

Upon completion of a series of processes, the display image process routine (S63 or S580) ends.

Figure 13:
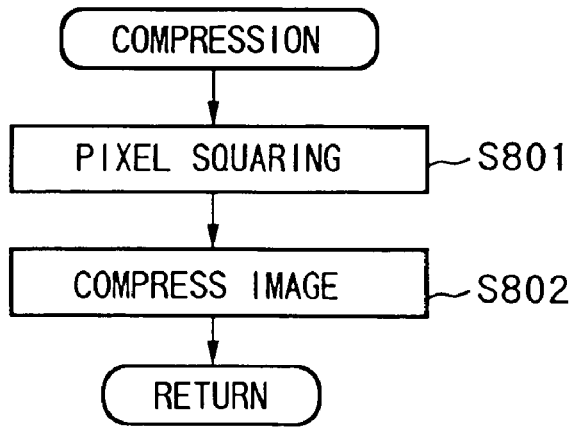
FIG. 13 is a flow chart showing a compression process in detail.

FIG. 13 is a flow chart showing the compression process in step S568 in FIG. 10 in detail.

The system control circuit 50 executes a pixel squaring process for reading out sensed image data written in the memory 30, and converting the vertical-to-horizontal pixel ratio of the image sensing element to 1:1 by interpolation using the memory control circuit 22 and image processing circuit 20 if required (S801). The system control circuit 50 then writes the processed image data in the memory 30.

The system control circuit 50 reads out image data written in the memory 30, and executes image compression corresponding to the selected mode using the compression/expansion circuit 32 (S802).

Upon completion of image compression, the compression process routine in step S568 ends.

The second embodiment of the present invention has been explained using FIG. 7.

In the description of the above embodiment, the compression modes include two different modes, i.e., the JPEG mode and CCDRAW mode. However, the combination of compression modes is not particularly limited as long as an image mode corresponding to the input display signal format of the image display unit 28 is combined with an image mode corresponding to the output signal format of the image sensing element 14.

In this case as well, when the image mode corresponding to the input display signal format of the image display unit 28 is selected, recording can be done while quickly playing back and confirming a sensed image immediately after image sensing. On the other hand, when the image mode corresponding to the output signal format of the image sensing element 14 is selected, recording that utilizes image information of the image sensing element 14 can be done, and a sensed image can be played back and confirmed at the same time. The user can select one of the aforementioned image modes in correspondence with the situation of the image sensing location and the image sensing purpose and can take an image.

When the image display unit 28 is turned off, all building components of the image display unit 28 are turned off, but only some building components of the image display unit 28 may be turned off. In such case, a function that can attain both confirmation of the sensed image and power savings can be implemented. For example, when the image display unit 28 is comprised of an LCD and backlight, the backlight alone may be turned off while the LCD is kept ON, thus implementing the function that can attain both confirmation of the sensed image and power savings as in the description of the embodiment.

The image display ON/OFF switch 66 and quick review ON/OFF switch 68 are independently equipped. However, the image display ON/OFF switch 66 and quick review ON/OFF switch 68 may be combined into a single, common switch, and that switch may have three positions, i.e., image display ON/image display ON for quick review alone/image display OFF.

In the above description, upon reception of an end instruction of the quick review display on the image display unit 28, an elapse of the minimum review time in which the quick review display continues for a minimum period of time is checked. However, no minimum review time may be set. In such case, in the flow chart in FIG. 9, step S542 of checking an elapse of the minimum review time is omitted.

Also, dedicated image display units for the through display and quick review display may be equipped, and may be turned on/off in correspondence with the setups of the image display ON/OFF switch and quick review ON/OFF switch, respectively. In this case as well, the function that can attain both confirmation of the sensed image and power savings can be implemented as in the description of the embodiment.

In the above description, when the image display ON/OFF switch is ON, the quick review display immediately after image sensing is made irrespective of the setups of the quick review ON/OFF switch. However, when the image display ON/OFF switch is ON, whether or not the quick review display is made may be determined in correspondence with the setups of the quick review ON/OFF switch.

Note that the recording media 200 and 210 are not limited to memory cards such as PCMCIA cards, compact flash cards, or the like, hard disks, and the like, but may use micro DATs, magnetooptical disks, optical disks such as CD-Rs, CD-WRs, or the like, phase change optical disks such as DVDs, and the like.

Also, the recording media 200 and 210 may use hybrid media that integrate memory cards, hard disks, and the like. Furthermore, such hybrid media may include detachable media.

In the description of the embodiment, the recording media 200 and 210 are independent from the image processing apparatus 300 and are arbitrarily connectable. One or both the recording media 200 and 210 may be permanently connected to the image processing apparatus 300.

An arbitrary number (one or a plurality) of image recording media 200 or 210 may be connectable to the image processing apparatus 300.

In the above description, the recording media 200 and 210 are attached to the image processing apparatus. However, one or a combination of a plurality of recording media may be used.

To restate, according to the second embodiment, whether a sensed image is directly played back and displayed immediately after image sensing and is then recorded, or a sensed image is recorded by utilizing its image quality, and then is played back and displayed can be selected in correspondence with each image sensing situation, purpose, and the like.

The present invention is not limited to the above embodiments and various changes and modifications can be made within the spirit and scope of the present invention. Therefore, to apprise the public of the scope of the present invention the following claims are made.

What is claimed is:

1. An image processing apparatus for recording, and playing back and displaying a sensed still image and/or moving image on a recording medium, comprising:

an image sensing device, a control device, an optical finder, a display device having at least an electronic view finder function, a display setting device adapted to turn on and off said display device, and a review setting device adapted to turn on and off a review function before an image sensing operation of said image sensing device, wherein the display device has a first review function of displaying the sensed image immediately after an image sensing operation wherein said control device controls said display device to display the sensed image for a predetermined time period before start of recording the image on the recording medium, when said first review function had been previously turned on by said review setting device, even if said display device had been turned off by said display setting device, wherein the display device has a second review function wherein said control device controls said display device to display the sensed image after the image has been recorded on the recording medium, wherein the first review function records the image on the recording medium in a format according to an input signal to the display device, wherein the second review function records the image on the recording medium in a format of the image sensing device, and wherein a setting device allows for selection between the first review function and the second review function.

2. The apparatus according to claim 1, wherein said display device comprises a liquid crystal display, and is disabled by turning off only a backlight.

3. An image processing apparatus for recording, and playing back and displaying a sensed still image and/or moving image on a recording medium, comprising:

an image sensing device, a control device, an optical finder, a display device having at least an electronic view finder function, a display setting device adapted to turn on and off said display device, and a review setting device adapted to turn on and off a review function before an image sensing operation of said image sensing device, wherein the display device has a first review function of displaying the sensed image immediately after an image sensing operation wherein said control device controls said display device to display the sensed image for a predetermined time period before start of recording the image on the recording medium, when said first review function had been previously turned on by said review setting device, even if said display device had been turned off by said display setting device, and then sets said display device to a state instructed by said display setting device, wherein the display device has a second review function wherein said control device controls said display device to display the sensed image after the image has been recorded on the recording medium, wherein the first review function records the image on the recording medium in a format according to an input signal to the display device, wherein the second review function records the image on the recording medium in a format of the image sensing device, and wherein a setting device allows for selection between the first review function and the second review function.

4. The apparatus according to claim 3, wherein said display device comprises a liquid crystal display, and is disabled by turning off only a backlight.

5. An image processing apparatus for recording, and playing back and displaying a sensed still image and/or moving image on a recording medium, comprising:

an image sensing device, a control device, an optical finder, a display device having at least an electronic view finder function, a display setting device adapted to turn on and off said display device, and a review setting device adapted to turn on and off review function before an image sensing operation of said image sensing device, wherein the display device has a first review function of displaying the sensed image immediately after an image sensing operation wherein said control device controls said display device to display the sensed image for a time period during which a predetermined switch is continuously turned on before start of recording the image on the recording medium, when said first review function had been previously turned on by said review setting device, even if said display device had been turned off by said display setting device, wherein the display device has a second review function wherein said control device controls said display device to display the sensed image after the image has been recorded on the recording medium, wherein the first review function records the image on the recording medium in a format according to an input signal to the display device, wherein the second review function records the image on the recording medium in a format of the image sensing device, and wherein a setting device allows for selection between the first review function and the second review function.

6. The apparatus according to claim 5, wherein said display device comprises a liquid crystal display, and is disabled by turning off only a backlight.

7. An image processing apparatus for recording, and playing back and displaying a sensed still image and/or moving image on a recording medium, comprising:

an image sensing device, a recording device, a control device, an optical finder, a display device having at least an electronic view finder function, a display setting device adapted to turn on and off said display device, and a review setting device adapted to turn on and off review function before an image sensing operation of said image sensing device, wherein the display device has a first review function of displaying the sensed image immediately after an image sensing operation wherein said control device controls said display device to display the sensed image for a predetermined time period before start of recording the image on the recording medium, when said first review function had been previously turned on by said review setting device, even if said display device had been turned off by said display setting device, and transfers the image to said recording device for recording the image on the recording medium, wherein the display device has a second review function wherein said control device controls said display device to display the sensed image after the image has been recorded on the recording medium, wherein the first review function records the image on the recording medium in a format according to an input signal to the display device, wherein the second review function records the image on the recording medium in a format of the image sensing device, and wherein a setting device allows for selection between the first review function and the second review function.

8. The apparatus according to claim 7, wherein said display device comprises a liquid crystal display, and is disabled by turning off only a backlight.

9. An image processing apparatus for recording, and playing back and displaying a sensed still image and/or moving image on a recording medium, comprising:

an image sensing device, a recording device, a control device, an optical finder, a display device having at least an electronic view finder function, a display setting device adapted to turn on and off said display device, and a review setting device adapted to turn on and off a review function before an image sensing operation of said image sensing device, wherein the display device has a first review function of displaying the sensed image immediately after an image sensing operation wherein said control device controls said display device to display the sensed image for a time period during which a predetermined switch is continuously turned on before start of recording the image on the recording medium, when said first review function had been previously turned on by said review setting device, even if said display device had been turned off by said display setting device, and transfers the image to said recording device for recording the image on the recording medium, wherein the display device has a second review function wherein said control device controls said display device to display the sensed image after the image has been recorded on the recording medium, wherein the first review function records the image on the recording medium in a format according to an input signal to the display device, wherein the second review function records the image on the recording medium in a format of the image sensing device, and wherein a setting device allows for selection between the first review function and the second review function.

10. The apparatus according to claim 9, wherein said display device comprises a liquid crystal display, and is disabled by turning off only a backlight.

11. A control method, of an image processing apparatus comprising a display device, for recording, and playing back and displaying a sensed still image and/or moving image on a recording medium, comprising:

controlling said display device to display the sensed image, wherein the display device has a first review function of displaying the sensed image immediately after an image sensing operation wherein a control device controls said display device to display the sensed image for a predetermined time period before start of recording the image on the recording medium, when said first review function had been previously turned on by a review setting device, even if said display device had been turned off by a display setting device, wherein the display device has a second review function wherein said control device controls said display device to display the sensed image after the image has been recorded on the recording medium, wherein the first review function records the image on the recording medium in a format according to an input signal to the display device, wherein the second review function records the image on the recording medium in a format of an image sensing device of said image processing apparatus, wherein a setting device allows for selection between the first review function and the second review function, wherein said display device having at least an electronic view finder function, said display setting device, and said review setting device, and wherein said display setting device is adapted to turn on and off said display device, and wherein said review setting device is adapted to turn on and off a review function before an image sensing operation.

12. A control method, of an image processing apparatus comprising a display device, for recording, and playing back and displaying a sensed still image and/or moving image on a recording medium, comprising:

controlling said display device to display the sensed image, wherein the display device has a first review function of displaying the sensed image immediately after an image sensing operation wherein a control device controls said display device to display the sensed image for a predetermined time period before start of recording the image on the recording medium, when said first review function had been previously turned on by a review setting device, even if said display device had been turned off by a display setting device, and then sets said display device to a state instructed by said display setting device, wherein the display device has a second review function wherein said control device controls said display device to display the sensed image after the image has been recorded on the recording medium, wherein the first review function records the image on the recording medium in a format according to an input signal to the display device, wherein the second review function records the image on the recording medium in a format of an image sensing device of said image processing apparatus, wherein a setting device allows for selection between the first review function and the second review function, wherein said display device has at least an electronic view finder function, said display setting device, and said review setting device, and wherein said display setting device is adapted to turn on and off said display device, and wherein said review setting device is adapted to turn on and off a review function before an image sensing operation.

13. A control method, of an image processing apparatus comprising a display device, for recording, and playing back and displaying a sensed still image and/or moving image on a recording medium, comprising:

controlling said display device to display the sensed image, wherein the display device has a first review function of displaying the sensed image immediately after an image sensing operation wherein a control device controls said display device to display the sensed image for a time period during which a predetermined switch is continuously turned on before start of recording the image on the recording medium, when said first review function had been previously turned on by a review setting device, even if said display device had been turned off by a display setting device, wherein the display device has a second review function wherein said control device controls said display device to display the sensed image after the image has been recorded on the recording medium, wherein the first review function records the image on the recording medium in a format according to an input signal to the display device, wherein the second review function records the image on the recording medium in a format of an image sensing device of said image processing apparatus, wherein a setting device allows for selection between the first review function and the second review function, wherein said display device has at least an electronic view finder function, said display setting device, and said review setting device, and wherein said display setting device is adapted to turn on and off said display device, and wherein said review setting device is adapted to turn on and off a review function before an image sensing operation.

14. A control method, of an image processing apparatus comprising a display device, for recording, and playing back and displaying a sensed still image and/or moving image on a recording medium, comprising:

controlling said display device to display the sensed image, wherein the display device has a first review function of displaying the sensed image immediately after an image sensing operation wherein a control device controls said display device to display the sensed image for a time period during which a predetermined switch is continuously turned on before start of recording the image on the recording medium, when said first review function had been previously turned on by a review setting device, even if said display device had been turned off by a display setting device, and setting sets said display device to a state instructed by said display setting device, wherein the display device has a second review function wherein said control device controls said display device to display the sensed image after the image has been recorded on the recording medium, wherein the first review function records the image on the recording medium in a format according to an input signal to the display device, wherein the second review function records the image on the recording medium in a format of an image sensing device of said image processing apparatus, wherein a setting device allows for selection between the first review function and the second review function, wherein said display device has at least an electronic view finder function, said display setting device, and said review setting device, and wherein said display setting device is adapted to turn on and off said display device, and wherein said review setting device is adapted to turn on and off a review function before an image sensing operation.

15. A control method, of an image processing apparatus comprising a display device, for recording, and playing back and displaying a sensed still image and/or moving image on a recording medium, comprising:

controlling said display device to display the sensed image, wherein the display device has a first review function of displaying the sensed image immediately after an image sensing operation wherein a control device controls said display device to display the sensed image for a time period during which a predetermined switch is continuously turned on before start of recording the image on the recording medium, when a said first review function had been previously turned on by a review setting device, even if said display device had been turned off by a display setting device, and transfers the image to a recording device for recording the image on the recording medium, wherein the display device has a second review function wherein said control device controls said display device to display the sensed image after the image has been recorded on the recording medium, wherein the first review function records the image on the recording medium in a format according to an input signal to the display device, wherein the second review function records the image on the recording medium in a format of an image sensing device of said image processing apparatus, wherein a setting device allows for selection between the first review function and the second review function, wherein said display device has at least an electronic view finder function, said display setting device, and said review setting device, and wherein said display setting device is adapted to turn on and off said display device, and wherein said review setting device is adapted to turn on and off a review function before an image sensing operation.

16. A control method, of an image processing apparatus comprising a display device, for recording, and playing back and displaying a sensed still image and/or moving image on a recording medium, comprising:

controlling said display device to display the sensed image, wherein the display device has a first review function of displaying the sensed image immediately after an image sensing operation wherein a control device controls said display device to display the sensed image for a time period during which a predetermined switch is continuously turned on before start of recording the image on the recording medium, when said first review function had been previously turned on by a review setting device, even if said display device had been turned off by a display setting device, transferring transfers the image to a recording device for recording the image on the recording medium, and sets said display device to a state instructed by said display setting device, wherein the display device has a second review function wherein said control device controls said display device to display the sensed image after the image has been recorded on the recording medium, wherein the first review function records the image on the recording medium in a format according to an input signal to the display device, wherein the second review function records the image on the recording medium in a format of an image sensing device of said image processing apparatus, wherein a setting device allows for selection between the first review function and the second review function, wherein said display device has at least an electronic view finder function, said display setting device, and said review setting device, and wherein said display setting device is adapted to turn on and off said display device, and wherein said review setting device is adapted to turn on and off said a review function before an image sensing operation.

17. A storage medium storing a program executed by a controller implementing the control method of claim 11.

18. A storage medium storing a program executed by a controller implementing the control method of claim 12.

19. A storage medium storing a program executed by a controller implementing the control method of claim 13.

20. A storage medium storing a program executed by a controller implementing the control method of claim 14.

21. A storage medium storing a program executed by a controller implementing the control method of claim 15.

22. A storage medium storing a program executed by a controller implementing the control method of claim 16.

* * * * *